United States Patent [19]

Scriver

[11] 4,092,715
[45] May 30, 1978

[54] INPUT-OUTPUT UNIT HAVING EXTENDED ADDRESSING CAPABILITY

[75] Inventor: Robert Edmund Scriver, Phoenix, Ariz.

[73] Assignee: Honeywell Information Systems Inc., Phoenix, Ariz.

[21] Appl. No.: 726,019

[22] Filed: Sep. 22, 1976

[51] Int. Cl.² ............................................. G06F 9/10
[52] U.S. Cl. .................................................. 364/200
[58] Field of Search ...................... 364/200, 300, 900

[56] References Cited

U.S. PATENT DOCUMENTS

| 3,576,543 | 4/1971 | Melliar-Smith | 340/172.5 |
| 3,704,453 | 11/1972 | Blackwell et al. | 340/172.5 |
| 3,938,096 | 2/1976 | Brown et al. | 340/172.5 |
| 3,947,823 | 3/1976 | Padegs et al. | 340/172.5 |
| 3,955,180 | 5/1976 | Hirtle | 340/172.5 |
| 3,970,999 | 7/1976 | Elward | 340/172.5 |
| 3,976,978 | 8/1976 | Patterson et al. | 340/172.5 |

Primary Examiner—Mark E. Nusbaum

Attorney, Agent, or Firm—William W. Holloway, Jr.; Ronald T. Reiling; Nicholas Prasinos

[57] ABSTRACT

In a data processing system employing paging and segmentation for storing information in memory, the input-output unit is provided with addressing capability for addressing and accessing memory without the intervention of the central processing unit. Page tables are set up in memory containing page table words, and a page table is assigned to each peripheral. A peripheral control word assigned to each peripheral includes a pointer to the start of the peripheral's page table whereby the peripheral through the I/O unit can locate its assigned page table, and page table words therein are combined with other control words to access paged memory locations.

In one mode of operation an extended addressing mechanism is provided which allows the generation of absolute addresses of paged memory locations having an address field larger than the address field of the control words used to access such paged memory locations.

1 Claim, 17 Drawing Figures (TDCW SEG BIT)

(LB+A>256K)

(LB>256K)

(256K OVERFLOW)

INPUT-OUTPUT UNIT HAVING EXTENDED ADDRESSING CAPABILITY

CROSS-REFERENCE TO RELATED INVENTIONS

The present invention is related to the following inventions, all assigned to the same assignee as the present invention:

1. "Method and Means of Storing and Accessing Information In A Shared Access Multiprogrammed Data Processing System", Ser. No. 462,144, filed Apr. 18, 1974.

2. "Method of Accessing Paged Memory By An Input-Output Unit", Ser. No. 591,549, now abandoned, filed June 30, 1975.

FIELD OF THE INVENTION

This invention relates generally to the accessing of paged memory storage in an electronic data processing system and, more particularly, to an address formation mechanism which permits the generation of absolute addresses of paged memory locations having address fields which exceed the address fields of the control words used to access such paged memory locations.

BACKGROUND OF THE INVENTION

Electronic data processing systems comprise several basic units: a central processing unit, a main memory, an input-output unit, and a system controller. The processor performs arithmetic and logic functions, the main memory stores program instructions and data, the I/O unit interfaces peripheral devices and remote users to the system, and the controller coordinates all operations. Typically, as in the Honeywell 6000 system, for example, all I/O operations including main memory access are handled through the system controller.

As the role of data processing has grown larger, the demand has increased for larger capacity computer systems to handle the ever increasing processing requirements. Processing speeds as well as data capacity have increased. One limitation of system size has been the cost of high-speed main memories. Such memories, whether core or semiconductor, are considerably more expensive than larger capacity but slower bulk memories such as magnetic disks or tapes.

Since a user needs only a portion of his program and data in storage for execution at any given time, the concept of program segmentation and memory paging evolved. The Honeywell 6800 system and its predecessors are examples of computer systems which have successfully employed segmentation and paging techniques. With these techniques, extended memories may be employed with main memory with users seeing a "virtual memory" of greater capacity than the real main memory.

By calling only a portion of the user's program and data into execution at any given time, the capacity requirements of main memory are reduced. Further, the use of pages for memory storage permits greater flexibility in memory use since a page may be stored wherever space permits, without the need for storing all related pages together. Such overhead functions as periodic memory compacting, for example, are eliminated. User security is also enhanced through the use of memory paging.

Since pages of data or instructions may be stored wherever available space is found, page tables must be maintained for locating the stored pages. Memory addresses are provided by page table lookup, and by adding an offset to the desired page address if only a portion of the page is to be accessed. Further, a limit or bound may be expressed which further limits the accessible portion of the page. A secure method of accessing memory through use of descriptor-defined base, bounds, and access rights is disclosed in related invention No. 1.

The development and verification of addresses for paged memory, with or without bounds verification, require considerable time which has heretofore limited the system processor time for program execution.

In order to increase the total address space of the paged memory data processing system, an extended address mechanism is provided which permits the accessing by peripherals through an input-output unit of paged memory locations having an address field exceeding that of the address field of the control words used to access such paged memory locations. By so increasing the total address space, the data processing system can accommodate increased data processing loads. According to the present invention this is done without increasing the length of the control words used to access the paged memory locations or the address fields thereof.

SUMMARY OF THE INVENTION

An object of the invention is to provide an extended addressing mechanism for accessing paged memory locations by peripherals through an input-output unit, wherein the address field of the paged memory locations exceeds the address field of the control words used to access the paged memory locations.

It is a further object of the invention to provide an extended addressing mechanism for accessing paged memory locations by peripherals through an input-output unit, wherein boundary fault logic is provided to indicate a boundary fault when access is attempted beyond the address space permitted for a particular mode of input-output unit operation.

Briefly, in accordance with the invention, peripheral access to paged memory is effected by providing a page table in memory for each peripheral device connected to the I/O unit. For an I/O operation involving a particular peripheral, a page table pointer associated with the peripheral points to the beginning of the peripheral's page table, which is used as a base or starting point, to which an offset may be added to obtain the page table word representing the address of the desired page from which or to which instructions or data is to be sent.

More particularly, in a preferred embodiment each peripheral channel of the I/O unit is provided with, as part of a peripheral control word (PCW), a page table pointer (PTP) which identifies the memory location for the start of the page table associated with the instructions and data for the peripheral connected to such channel. The PCW for a particular channel may be stored in a portion of a scratchpad memory located in the I/O unit which is assigned to said channel. The I/O scratchpad memory may also provide storage, on a channel-by-channel basis, for various other control words used to carry out an I/O operation with a peripheral device, including a list pointer word (LPW), a list pointer word extension (LPWX), a data control word (DCW), and two page table words (PTW). The LPW, LPWX, and DCW may be stored in scratchpad memory mailboxes as described below. The PCW, LPWX, LPW, DCW, and PTWs are provided by the operating system software.

Four types of addressing services are performed by the preferred embodiment of the present invention. List pointer word (LPW) addressing is one of these types of addressing services and constitutes the process whereby the beginning of a list of data control words (DCWs) or instruction data control words (IDCWs) is identified for a particular peripheral, which DCWs or IDCWs are to be utilized in controlling the operations of the peripheral and the transfer of data to or from the peripheral. In an LPW addressing service, the page table pointer and a first portion of the list pointer word, representing a page table offset, contained in the mailbox associated with the particular peripheral are combined to identify a page table word representing the location of a page containing DCWs and IDCWs for that peripheral. A second portion of the list pointer word, representing a page offset, is then combined with the page table word obtained in the previous step to provide an absolute address for the desired DCW or IDCW within the page of DCWs and IDCWs.

Data control word addressing, which comprises the second and third types of addressing services performed by the present invention, serves to locate the absolute address in main memory at which data is to be stored from the peripheral or from which data is to be accessed and sent to the peripheral. In the second type, known as an indirect data service, it includes combining the page table pointer assigned to the particular peripheral channel with the data control word previously identified in the list pointer word addressing service. The page table pointer is first combined with a first portion of the DCW, representing a page table offset, to locate in the peripheral's page table the page table word representing the location of the desired page in main memory. A second portion of the DCW, representing a page offset, is then combined with the located page table word to provide the absolute address of the memory location to which or from which data is to be sent.

A third addressing service which may be performed by the present invention is one in which the data control word which is to control the particular data transfer is provided to the I/O unit directly by the peripheral channel, eliminating the necessity for a list pointer word service. According to this type of service, referred to as a direct data service, a first portion of the direct channel word, representing a page table offset, is combined with the page table pointer associated with the particular peripheral channel to identify a page table word in the page table assigned to the peripheral channel. Next, a second portion of the direct channel word, representing a page offset, is combined with the previously identified page table word to indicate the absolute address of the desired memory location.

In the fourth type of addressing service, access is provided to an auxiliary page, i.e., a page not located in the page table assigned to the peripheral, by combining the peripheral's channel number with the I/O unit base address located in a main memory mailbox. This type is a variety of list pointer word addressing.

For the list pointer word indirect data service operations several different modes of addressing main memory are possible, at least one of which permits the addressing of an extended amount of memory. While 256K (1K=1024) words of main memory are normally addressable, up to 512K words may be addressed in the extended addressing mode of operation. According to this mode of operation logic is provided to increase the effective LPW and DCW address fields by one bit in any one of three ways, as will be described in greater detail in the detailed description of the preferred embodiment.

The invention and objects and features thereof will be more fully understood from the following description and appended claims when taken with the drawings.

DESCRIPTION OF THE PREFERRED EMBODIMENT

Figure 1:
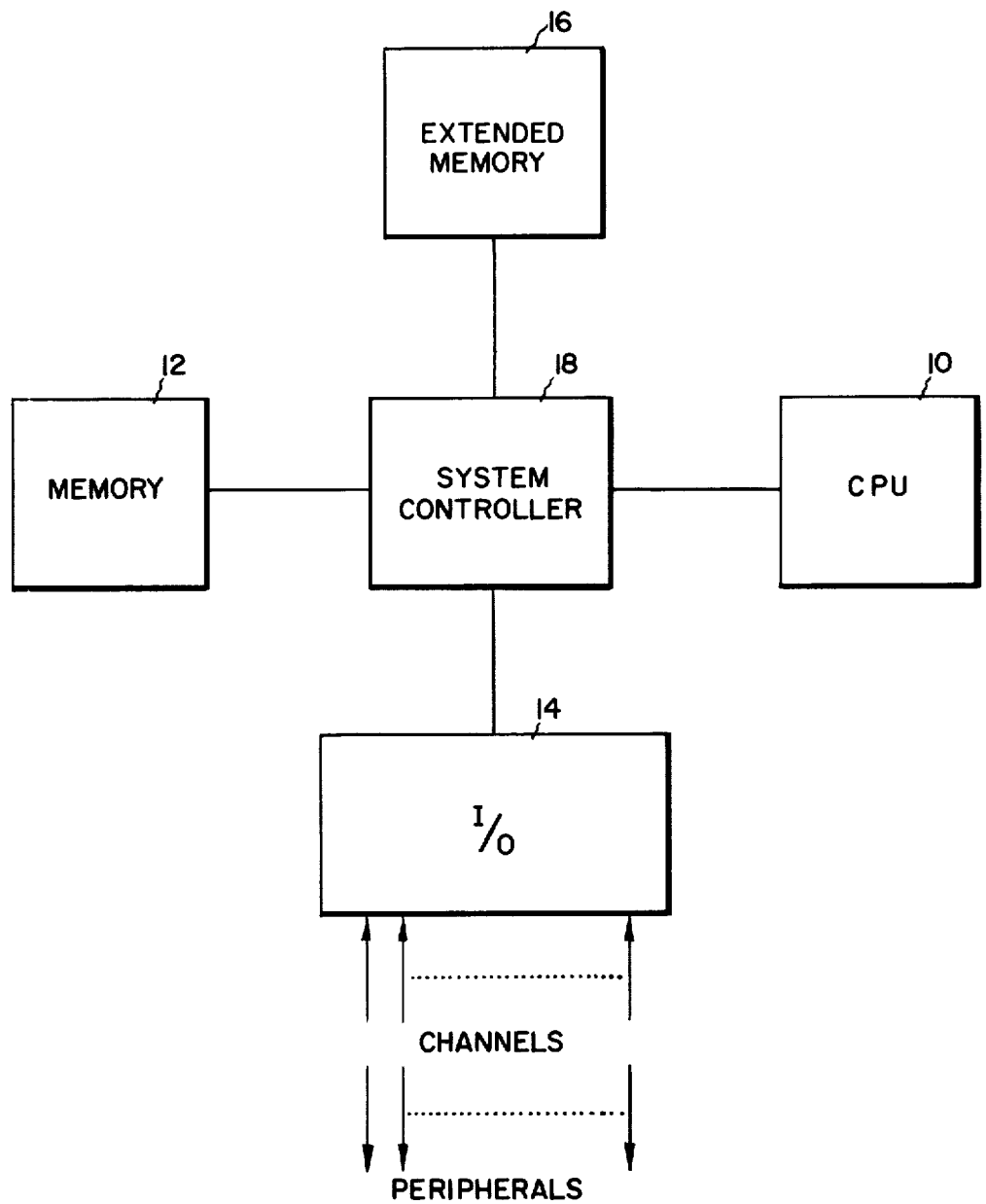
FIG. 1 is a functional diagram illustrating the major components of a data processing system in which the present invention is employed.

FIG. 1 is a block diagram of a data processing system, such as the Honeywell 6600 system, for example, in which the present invention may be employed. Typically, the system has a central processing unit (CPU) 10 which performs arithmetic and logic functions on data in response to program instructions, a main memory 12 in which program instructions and data are stored for program execution, and an input-output (I/O) unit 14 with a plurality of channels through which data and programs are exchanged between peripheral users and the processing system. Additionally, bulk storage 16 serves as an extended memory and comprises a bulk storage controller and a plurality of bulk storage units. Coordination of system operations is provided by a system control unit (SCU) 18 through which all communications with main memory 12 are passed.

Since communication between I/O 14 and SCU 18 may be at a much higher rate than communication between I/O 14 and peripheral devices, each I/O device can accommodate a plurality of channels on a multiplexed basis. In the Honeywell 6600 system, for example, the input-output multiplexer (IOM) may have up to 47 channels and each channel may communicate with a plurality of peripheral devices through a microprogrammed peripheral controller, or a direct channel may communicate with a single peripheral device such as a Honeywell Datanet 355 Communication Processor. Each IOM operates essentially as a stored program device controlled by, and sharing memory accesses with, the CPU. Data block transfer operations are initiated by the operating system software. Peripheral device operations are controlled by a processor prepared data control word list for each peripheral channel, comprising instruction data control words (IDCW), transfer data control words (TDCW), and I/O data control words (DCW), which are stored in pages in memory 12. Instruction data control words (IDCW) are generated by the operating system software and by unrestricted user programs to provide instructions for a peripheral device at an appropriate predetermined place in the peripheral's DCW list. Transfer data control words (TDCW) are used by the operating system software and unrestricted user to transfer from one DCW list to another DCW list. I/O data control words (DCW) specify the areas of memory to or from which data is to be transferred. A list pointer word (LPW) indicating the location of a DCW list is stored in the LPW mailbox associated with the particular peripheral channel. The IOM is provided with scratchpad memory "mailboxes" for storing DCWs and LPWs for each channel. Reference may be made to the disclosure contained in U.S. Pat. No. 3,413,609 and to the patents referenced therein for a thorough description of an input-output unit similar to that employed by the present invention.

Figure 9:
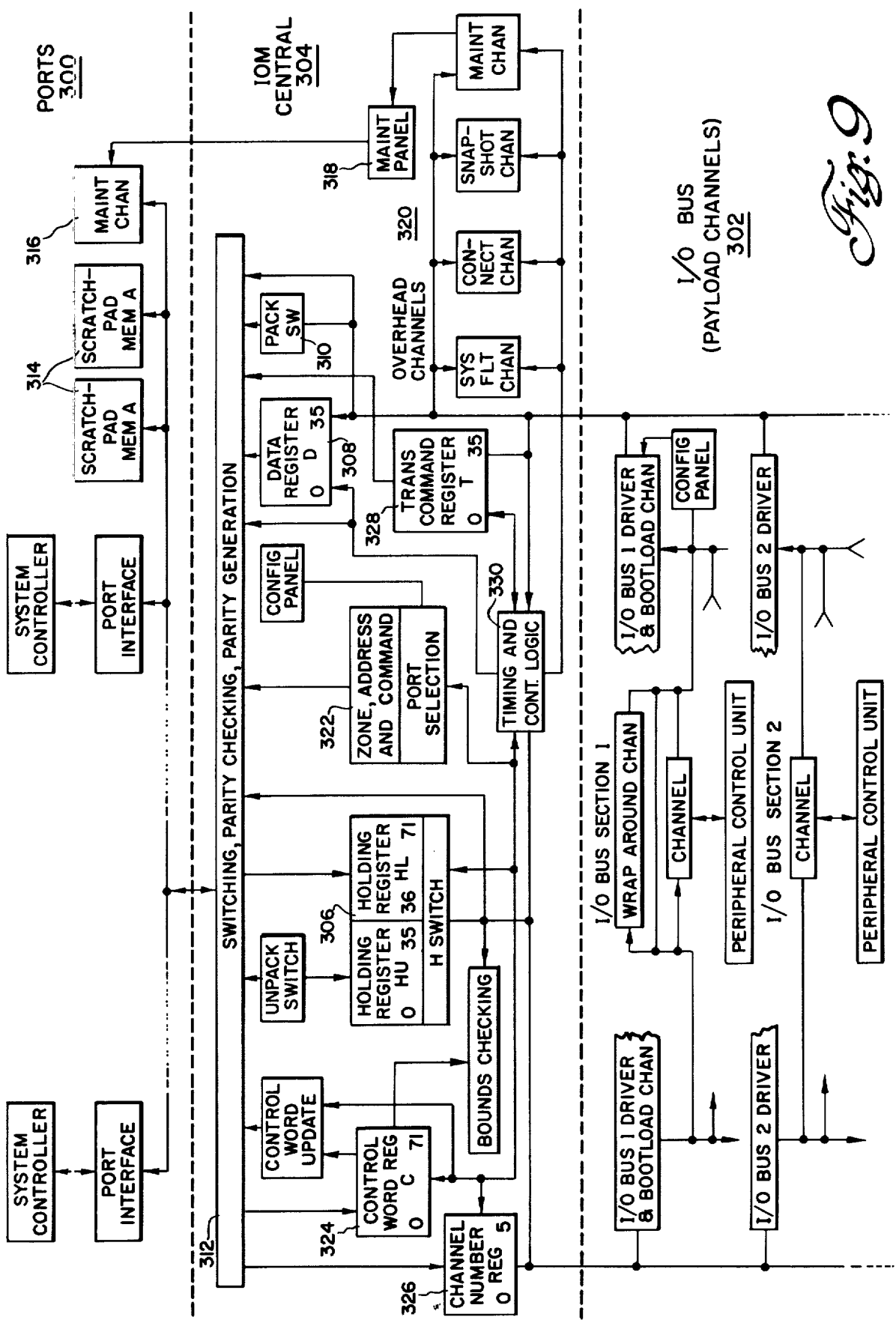
FIG. 9 is a functional diagram of a Honeywell 6600 Input-Output Multiplexer (IOM) in which the present invention may be employed.

FIG. 9 is a functional block diagram of the Honeywell 6600 IOM. Port interfaces to the system controller are shown generally at 300, the IOM central portion is shown generally at 304, and the I/O bus to the peripheral control unit channels are shown generally at 302. Information flows from the system controller through holding register 306 to peripherals, and information from peripherals flows through data register 308 and packing switch 310 to the system controller. Data to and from the system controller is in 72 bit words while data to and from peripheral control channels is in 36 bit words. Data flows through bus 312 wherein switching, parity checking, and parity generation are performed. Also connected to bus 312 are scratchpads 314 and a maintenance channel 316 including maintenance panel 318 and overhead channels 320. Page addressing, in accordance with the present invention, and other address and command functions are performed in unit 322. Control word register 324, channel register 326, and transaction register 328, functions of which are described further below, are interconnected along with a timing and control logic unit 330.

As above described, the Honeywell 6600 system and the 6600 IOM are commercially available, and only so much of the details thereof are given as to understand the extended addressing mechanism of the I/O page address development in accordance with the present invention.

IOM Registers and Data Flow

The logic circuitry in the IOM basically performs the task of transferring information between the payload channels (which are in turn transferring information to and from the peripheral devices) and the system controller(s).

The information which is transferred is in one of three forms:

1. control information being sent to a channel to control the channel's next sequence of operations; 2. data information which is being exchanged between the 6600 system's primary storage (core memory) and the input-output device storage (card readers, tapes, disks, etc.); and 3. status information originated by a channel to indicate channel/peripheral device conditions.

Active operation of the IOM is initiated by a request for service from one of the channels (either a payload channel or an overhead channel). The IOM will perform the service requested, then return to an idle condition until another request for service is generated. The first word of information transmitted to the IOM central 304 from a channel which has asked for service is the transaction command word (TCW), which word is stored in the 36-bit transaction command register 328. The contents of the transaction command register 328 are used to control the operation of the IOM central during the service. The transaction command word is basically formatted as follows:

| 0 | 17 | 18 | 20 | 21 | 26 | 27 | 29 | 30 | 32 | 33 | 35 |
|---|---|---|---|---|---|---|---|---|---|---|---|
| TCW | Special Address or Status Information | | Addr. Ext. | | Channel Number | | Type of Serv. | | Spec. Instr. | | Addr. Ext. |

Most of the information transferred by the IOM is done in an indirect mode; that is, the source or destination within the primary storage module (core memory) of the information to be transferred is specified by a data control word. Therefore, every indirect service involves fetching the appropriate data control word from its mailbox in either core storage or scratchpad storage and placing it in IOM control word register 324.

The control word register 324 (C-REG) comprises two 36-bit segments, C 0-35 and C 36-71. C 0-35 is used to hold the first word of a double-precision control word such as a list pointer word (LPW), or the only word of a single-precision control word such as a DCW or a status control word (SCW). C 0-35 is implemented for the most part as a storage register. The control word addresses (bits 0-17) and character position fields (bits 18-20) are incremented and the tallies (bits 24-35) are decremented by use of adder chips. C 36-71 is implemented as a storage register only, since no counting operations are required on this portion of the control word. The C-register 0-17 is used to provide a stable address base for the indirect service in progress.

The holding register 306 (H-REG) is a 72-bit-plus-2-parity storage register which serves two functions. Its primary function is to place the information on the I/O bus 302. This information can be in the form of data or in the form of either a PCW or a DCW. Its secondary function is to temporarily store information which will later be placed in either core storage or scratchpad storage. Insofar as the present invention is concerned, the H-register stores a DCW obtained during a list service, or the data from sctatchpad storage obtained during a scratchpad access service.

The IOM central 304 provides the capability for handling three different byte sizes during data transfer operations. The predominant byte sizes are either a 72-bit (plus 2 parity bits) double-precision word or a 36-bit (plus 1 parity bit) single-precision word. However, a 9-bit byte can also be transferred. If a 9-bit byte is being transferred from core storage to a peripheral device, the unpack switch will select the appropriate byte and right-justify it before it is stored in the H-register 306.

The IOM is capable of creating absolute DCW addresses during a list service by using information from the List Pointer Word Extension LPWX (stored in the C-register 324) and the relative DCW (stored in the H-register 306). In addition to creating absolute DCW addresses, various tests are made to insure that the resulting DCW will not result in data being transferred to or from a restricted area of core storage.

The channel number register 326 is a 6-bit storage register which temporarily stores the channel number of the channel to which a PCW is being directed. The contents of this register are gated out to the I/O bus 302 at the appropriate time during service for the connected channel.

The data register 308 (D-REG) is a 36-bit-plus-parity storage register which is used to hold 1. data from a channel for single-precision 36-bit data store services, 2. the first word of data from a channel for double-precision data store services, and 3. a status word from a channel for status services. Since a double-precision data word comes from a 36-bit wide bus, the first word is stored in the D-register, allowing the second word to be put on the bus. At this point, the data is transferred to the ports as a 72-bit wide (plus 2 parity bits) pattern, taking 36-bits plus parity from the D-register and 36-bits plus parity from the I/O bus. If the scratchpad address used is greater than the address associated with the last available scratchpad word, the data will be read from (or written into) the core location which corresponds to that address; that is, the scratchpad access channel can be used to read from or write into any address specified in the PCW, ORed with the IOM base address. If there is scratchpad storage corresponding to that address, the scratchpad storage will be accessed; if there is no corresponding scratchpad storage, core storage will be accessed.

BASIC OPERATION

IOM Operation

The IOM processes requests for service from channels on a demand/priority basis. The IOM is idle until a request for service is seen (demand), and for concurrent requests the highest ranking request will be processed first (priority).

The IOM moves information between core storage and various peripheral devices as controlled by demand from the peripheral control units associated with the peripheral devices. These operations do not occur continuously, but they are initiated by connects and controlled by control words, and their completions are indicated by program interrupts.

The operations of the IOM carried out for a particular overhead or payload channel. Each channel has assigned to it, based on its channel number and the IOM base address, a group of four control word locations in core memory, called main memory mailboxes. The mailboxes are arranged as follows:

| List Pointer Word (LPW) | LPW Mailbox |
| List Pointer Word Extension (LPWX) | LPWX Mailbox |
| Status Control Word (SCW) | SCW Mailbox |
| Data Control Word (DCW) | DCW Mailbox |

Certain channels may also have assigned to them auxiliary scratchpad storage for the four control words. If a channel has this auxiliary store assigned, it is referred to as a scratchpad channel. The two sets of mailboxes for a scratchpad channel appear as follows:

Core Storage

| LPW |
| LPWX |
| SCW |
| AUX PTW | } Mailboxes

Scratchpad

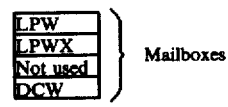

Indirect Data Service

An indirect data service transfers data, under control of a DCW, from core storage to a peripheral device (Load), or from the peripheral device to core storage (Store).

The quantity of data to be transferred per service is specified by the requesting channel's transaction command word as one of the following: 72 bits (a double-precision transfer); 36 bits (a single-precision transfer); 9 bits.

An indirect data service consists of three memory cycles: 1. fetch the channel's DCW from its mailbox (in scratchpad storage if this is a scratchpad channel, otherwise from core storage); 2. transfer the data to or from the location specified by the DCW, with or without address extension depending on mode and control bits in DCW; and 3. update the address and tally fields (and also the character position field for 9-bit transfers) of the DCW and restore it to the channel's DCW mailbox.

Direct Data Service

A direct data service likewise transfers data from core storage to a peripheral device (Load), or from the peripheral device to core storage (Store). It differs from an indirect data service in that the core storage address is specified in the channel's transaction command word.

The channel must specify the core storage address to be used, so only a "direct" channel can request direct data services. In general, a direct channel is more sophisticated than an indirect channel, since it must be provided with the logic circuitry for accessing, storing and updating the DCW.

A direct data service can transfer either 36 bits or 72 bits of data and consists of a single memory cycle: transfer the data to or from the location specified in the transaction command word. A direct read single-precision service may also be modified to perform a read clear service at the address specified in the transaction command word.

List Pointer Word (LPW)

The operating system software is responsible for generating certain control words used in I/O transfers and for making these control words available to the IOM by placing them in appropriate locations in core or scratchpad storage. The control words generated by the operating system software include list pointer words (LPW), peripheral control words (PCW), data control words (DCW), and status control words (SCW).

The list pointer word is used to define the location and length of a list of data control words for controlling the operation of a particular data channel. The LPW, along with the LPWX, include fields which control the updating of the LPW and check DCW for validity. The operating system software generates an LPW and LPWX for the particular data channel and places them in their appropriate locations in core or scratchpad storage before initiating an I/O operation for that data channel by means of a PCW. After the operation of the channel has been initiated, the IOM places into the LPWX the address of each IDCW which it encounters while servicing the list of DCW's.

The LPW and LPWX have the format shown below:

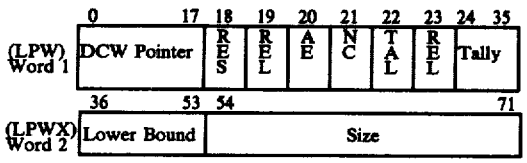

The various fields are defined as follows:

The DCW pointer (LPW 0-17) provides the least significant 18 bits of a 24-bit address of the DCW or PCW list. The most significant six address bits of the DCW depend on the state of LPW 20 (see below). Updating of this field is controlled by the NC (no change), TAL (tally control) and Tally fields. When updating is called for, the IOM central increments this field by one (two if the channel is the connect channel) during each list service.

The restricted bit (LPW 18) provides the operating system software with a way to restrict the use of instruction DCW's by users without having to scan all DCW lists. If this bit is a one and an instruction DCW is encountered by the IOM central, the I/O transaction is aborted and a user fault is indicated. If bit 18 is a zero, the list is unrestricted and instruction DCW's are allowed. When the IOM central encounters a transfer DCW (TDCW) during a list service, it logically OR's TDCW bit 34 into LPW bit 18, thereby providing the operating system software with a way to switch from unrestricted to restricted operation. Any subsequent encounter with an IDCW causes a user fault for that channel if LPW bit 18 has been set to one by the TDCW.

REL (LPW 19) is reserved for the storage of the REL flag (bit 23) condition at the time an IDCW is fetched or whenever a first-list service is performed.

AE (LPW 20) is the address extension flag. This bit defines when a DCW list is located in the first 256K of main memory (LPW 20 = 0), or when it is in the 256K block specified by means of an address extension (LPW 20 = 1). This bit can be changed from a zero to a one via a TDCW. In the event that bit 64 of the PCW (see below) is a one, and LPW 20 is also a one, all subsequent addressing of DCW's and data for the particular channel operation is done in a paged mode using the channel's page table.

NC (LPW 21) is the no change flag and provides the operating system software with a way to control the updating of the LPW (both address and tally fields). When set to a one, bit 21 inhibits the updating of the address and tally fields of the LPW.

TAL (LPW 22) is the tally indication control flag and provides the operating system software with a way to control the recognition of pre-tally run-out (PTRO) condition in any channel. When set to a one, bit 22 allows the recognition of PTRO; when zero, this condition is not indicated, and a tally of zero will not cause a fault indication. This bit is overridden by LPW bit 21 (NC).

REL (LPW 23) provides the operating system software with a way to control the interpretation of DCW addresses for indirect channels by the IOM as absolute or relative. Depending on whether this bit is zero or one, each DCW address is treated as absolute or relative, respectively. The IOM central converts relative addresses to absolute and checks them for boundary errors. Bit 23 of the LPW for the connect channel is ignored by the IOM central. When the IOM central encounters a TDCW during a list service it will logically OR TDCW bit 35 into LPW bit 23 to provide the operating system software with a way to switch immediately from absolute to relative operation. When both LPW 23 and PCW 64 are set to one, all DCW and data addressing is conducted in the paged, segmented mode.

Tally (LPW 24-35) defines the number of PCW's or DCW's remaining in the list. Updating of this field by the IOM central is controlled by the NC, TAL, and the Tally. When updating is called for, the IOM central decrements this field by one during each list service. The tally is decremented when a transfer DCW is encountered and is decremented again when the next DCW is pulled after the transfer has occurred. The payload channel never gets a PTRO indication. It must determine when to stop requesting list service on the basis of information in DCW or on the basis of some external influence.

The Lower Bound (LPW 36-53) provides the operating system software with a way of establishing a base address register for each data channel. The Lower Bound is an 18-bit mod 2 number when operating in the paged addressing mode and allows a user's area to be a 256K window in a 512K word working space when the REL (LPW 23) bit is set and PCW bits 63 and 64 are ones. The Lower Bound has a range of 2 to 512K.

The Size (LPW 54-71) is an 18-bit number indicating the permissible size (up to 256K) of user addressable memory space, as measured from the Lower Bound. The Size has a range of 1 to 256K.

When PCW 64 is off, indicating that paged addressing is not being used, the second word of the LPW, referred to as the LPWX, has the following format:

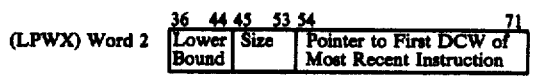

The Lower Bound (LPWX 36-44) and Size (LPWX 45-53) are now 8-bit numbers. The Pointer to First DCW of Most Recent Instruction (LPWX 54-71) is updated by the IOM central during the first list service after a PCW, and during any list service which encounters an Instruction DCW. Each time that this field is updated, the IOM central copies the DCW pointer field of the LPW (or the transfer DCW, if one is encountered) into this field of the LPWX in main memory, and in scratchpad when available. Thus, if the most recent instruction was a PCW, this field will point to the first data DCW; if the most recent instruction was an Instruction DCW, this field will point to the Instruction DCW.

Data Control Word (DCW)

The IOM utilizes five different types of DCWs. These are:

| Instruction DCW | (IDCW) |
| Transfer DCW | (TDCW) |
| I/O Transfer & Disconnect | (IOTD) |
| I/O Transfer & Proceed | (IOTP) |

| | |
|---|---|
| -continued | |
| I/O nontransfer & Proceed | (IONTP) |

The operating system software or user program generates appropriate DCW's for each data channel, and arranges the DCW's for each channel in a list. The list of DCW's for a channel must occupy sequential storage locations, except where one list is linked to another list by means of a transfer data control word (TDCW).

Instruction DCW: The IDCW is used by the operating system software and by unrestricted user programs to provide instructions for a peripheral device at an appropriate predetermined place in the peripheral's DCW list. The format of the IDCW is similar to the format of the PCW (see below). However, there is no counterpart in the IDCW for the PCW second word (which specifies the number of the channel that is to receive the PCW).

```
        0           11 12        17 18  20 21            35
       ┌───────────┬──────────┬─────┬─┬──────────┐
IDCW   │Interpreted│ Address  │ 111 │E│Interpreted│
       │by Channel │Extension │     │C│by Channel │
       └───────────┴──────────┴─────┴─┴──────────┘
```

The only field in the IDCW that is interpreted by the IOM central 304 is bits 18-20, which must be coded $111_2$ to identify the DCW as an IDCW. When a IDCW is encountered during a list service, all 36 bits of the IDCW are sent to the peripheral's channel. In general, the channel uses the information for such things as device instruction, channel instruction, record count, single character, core address (direct channels), and peripheral storage address.

Transfer DCW: The TDCW provides the operating system software and the unrestricted user with the ability to transfer from one DCW list to another DCW list. The format of the TDCW is shown below. Bits 24-30 are not used by IOM central and must be zero (MBZ).

```
 0              17 18 20 21 22 23 24   30 31 32 33 34 35
┌──────────────┬───┬─┬──┬────┬─┬─┬─┬─┬─┐
│              │Not│ │  │    │S│P│P│R│R│
│ DCW POINTER  │111│0│10│ MBZ│E│D│D│E│E│
│              │   │ │  │    │G│T│C│S│L│
│              │   │ │  │    │ │A│W│ │ │
└──────────────┴───┴─┴──┴────┴─┴─┴─┴─┴─┘
                 OR'd with LPW 23 into LPW 23 ──┘
                 OR'd with LPW 18 into LPW 18 ────┘
```

The DCW Pointer (0-17) specifies bits 6-23 of the address (absolute or relative, depending on the REL bit in the LPW) of the next DCW. The IOM central transforms the address into an absolute address, if necessary, and places bits 6-23 of the absolute address in the DCW pointer field of the LPW, so that subsequent DCWs will be obtained from the new list of DCWs. The most significant six bits (address extension) of the next DCW address are implied to be zero if LPW 20=1. If LPW 20=1, the address extension will be the present address extension held by the channel.

Bits 18-20 — must be some code other than 111.
Bit 21 — must be zero.
Bits 22-23 — must be coded $10_2$ to identify the DCW as a TDCW.
Bits 24-30 — must be zero.
Bit 31 – the SEG bit furnishes the nineteenth address bit for a TDCW address used for locating the DCW list in a 512 word page table. This is the bit that determines when and to what extent an address extension operation is carried out. It has meaning in the TDCW only where: (a) the DCW list is already paged and the TDCW calls for the DCW list to be segmented, or (b) the data is already segmented and the TDCW calls for the DCW list to be paged, or (c) data is not segmented and the DCW list is not paged and the TDCW calls for data to be segmented and the DCW list to be paged, and (d) an auxiliary PTW is not being used.

The operating system software uses the SEG bit to determine which half of the 512 word page table the list of DCW's starts in. When SEG=1, the DCW list starts in the first half of the 512 word page table; when SEG=0 the list of DCW's starts in the second half of the page table.

Bit 32 — the PDTA (Page Data) bit controls the operation of the IOM during data services when neither the PDCW nor REL bits are set. It determines whether the DCW address is real (PDTA=0) or whether the page table must be referenced (PDTA=1). This bit is stored on a channel basis and is reset when a connect is received for the particular channel. The state of the bit is overridden if either the PDCW or REL bit is set or if LPW bits 20 or 23 are set.

Bit 33 — the PDCW (Page DCW) bit indicates whether the LPW address is real (PDCW=0) or whether the page table must be referenced (PDCW=1). This bit is stored in LPW 20 for subsequent use.

Bit 34 — the RES bit is logically ORed into LPW bit 18 by the IOM to provide the program with a way to switch from unrestricted to restricted operation.

Bit 35 — the REL bit is logically ORed into LPW bit 23 by the IOM to provide the program with a way to switch from absolute to relative operation.

The I/O Transfer and Disconnect (IOTD), I/O Transfer and Proceed (IOTP), and I/O Nontransfer and Proceed (IONTP) DCWs define the address of a block of data in main memory which is to be transferred. The DCW format is shown below:

```
     0             17 18   20 21 22  23 24        35
    ┌──────────────┬──────┬──┬─┬────┬──────────┐
DCW │DATA ADDRESS  │  CP  │N │TYPE│  TALLY    │
    │              │      │U │    │           │
    └──────────────┴──────┴──┴────┴───────────┘
```

The Data Address (0-17) specifies the least significant 18 bits of the starting address of the block of data and is treated as either absolute or relative, depending on the REL bit in the LPW. The address extension, bits 0-5, is obtained from the channel and is appended to form a 24-bit address.

Character Position (18-20) specifies the position of the first character within the first word of the block. The byte size, defined by the channel, determines what CP values are valid.

Mod 64 Bit (21) — Not used.
Type (22-23) is coded to identify the type of DCW:
00 IOTD I/O Transfer and Disconnect. The current device instruction is ended (terminated) when the channel detects the tally run-out condition of the tally.
01 IOTP I/O Transfer and Proceed. The current device instruction proceeds to a new DCW when the channel detects the tally run-out condition of the tally.
Transfer DCW (TDCW). See above for description of TDCW operation.

11 IONTP Same as IOTP except that no core accesses are made. If data is being read from a peripheral device, the block of data is discarded. If data is being written to a peripheral device, the IOM central generates a block of zeros.

Tally (24–35) — Defines the number of words stored in the data block.

Paged Memory Addressing

In accordance with this invention paged memory addressing is performed by the I/O unit without CPU intervention. In the illustrative embodiment with the Honeywell 6600 system, 512 pages each having 1024 words may be located in random areas in main memory. Reference to page locations is maintained in a page table set up by the operating system software prior to activating an I/O channel operation. The absolute address of the beginning location of the channel page table, provided by the page table pointer, is given to the I/O channel as part of a two-word peripheral control word, which is used to activate the channel, and which is stored in the I/O scratchpad associated with the particular channel, assuming the channel is provided with an I/O scratchpad. Thereafter, a data control word or instruction data control word is obtained using a list pointer word pulled from a main memory mailbox, in conventional manner, and the DCW or IDCW is combined first with the PTP and then with a particular page table word of the channel page table to locate the real main memory address of the desired information block, as described in further detail below.

Peripheral Control Word

The PCW is used by the connect channel to initiate the operation of a channel, or to mask (turn off) the operation of a channel that was previously initiated. The operating system software can issue one or more PCW's with a single instruction by arranging the PCW's in a list and setting up an LPW for the connect channel to define the location and length of the list. Each PCW fills two words of core and occupies a y-pair, that is, a pair of words obtained by a double-precision core access. A list of PCW's occupies sequential y-pairs.

The peripheral control word has the following format:

```
       0   3   6   9   12  17 18  20 21   24 27 30 33 35
PCW   |                  |    |   | M |                 |
      | Channel Info.    | AE |111| S | Channel Info.   |
WD1   |_____|____|___| K |_____|

36       39  44 45                62 63 64   65 71
PCW   |    |       |                      | P | P | A |   |
      |N/U | Chan. | Page Table Pointer   | T | G | U |N/U|
WD2   |____| No.   | (PTP)                | P | E | X |___|
```

PCW WD1 is sent to the channel whose channel number is specified in bits 39–44 of PCW WD2. PCW WD2 is used only by the IOM central and is not sent to the channel.

PCW Word 1 Format

Bits 0–11 and 24–35 — Information used by the channel, according to the type of channel, for such things as device instruction, device code or address, mask, channel instruction, record count, single character, storage address (direct channels), and peripheral storage address.

Bits 12–17 — Address extension which is maintained by the channel for subsequent use by the IOM.

Bits 18–20 — Must be $111_2$ to identify the word as a PCW.

Bit 21 — Mask bit which changes channel operation from normal (MSK=0) to masked condition (MSK=1). The masked condition is a state in which a channel does not request service in spite of a need for such service generated in the channel.

PCW Word 2 Format

Bits 36–38
66–71 — Ignored by the IOM.

Bits 39–44 — Channel number which is stored in the channel number register 326.

Bits 45–62 — The 18-bit page table pointer (PTP). These are the upper 18 bits of a 24-bit address (lower 6 bits = 0) by which the I/O channel's page table is located.

Bit 63 — The PTP flag, which must be set if a PTW fetch is desired for the I/O operation.

Bit 64 — The PGE flag, which must be set to enable the segmented paged submodes of operation.

Bit 65 — Must be set to enable operation with a DCW list stored in a page which is identified by an "auxiliary PTW".

Parity is generated and stored for the page table pointer.

A comparator compares the incoming page table pointer with the information stored after the scratchpad has been written. A miscompare causes a scratchpad parity error system fault to be reported. The system fault logic prevents the PCW from being received by the channel by inhibiting the transfer of the contents of the channel number register 326 to the payload channel bus 302.

Memory Accessing Operation

For a normal list service, the channel's page table pointer (PTP) is combined with a portion of the channel's list pointer word (LPW) to locate from the channel's page table a page table word identifying the location of a list of DCWs.

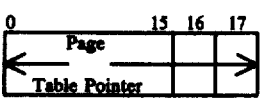

(Beginning of Page Table)

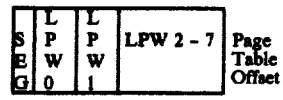

Figure 10:
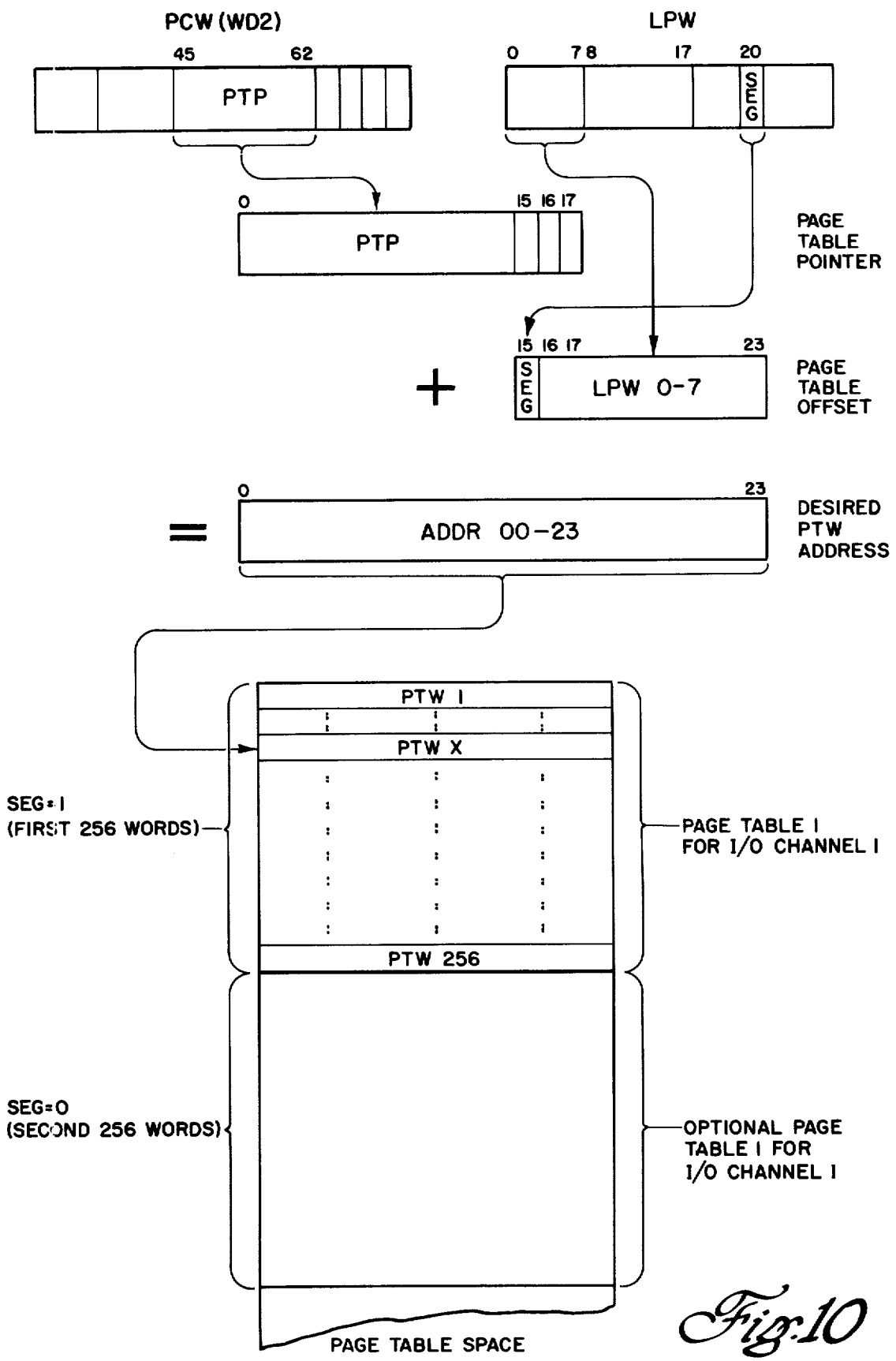
FIG. 10 is a representation of a first portion of a list pointer word addressing service.

The SEG, LPW0 and LPW1 bits are added to page table pointer bits 00–17 to generate ADDR 00–23, representing the desired page table word address. Refer to FIG. 10. The obtained page table word is subsequently combined with bits 8–17 of the channel's LPW, representing the page offset, to provide the absolute memory address of the desired DCW, as further described below in the detailed description of page table words.

For an indirect data service the I/O unit combines the PTP and the DCW which was obtained through a list service as previously described to locate by means of the channel page table the absolute memory address for the data. A new data page must be accessed in this fashion for each indirect data service following a list service or when a page overflow occurs.

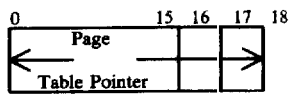

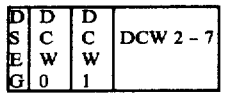

Figure 12:
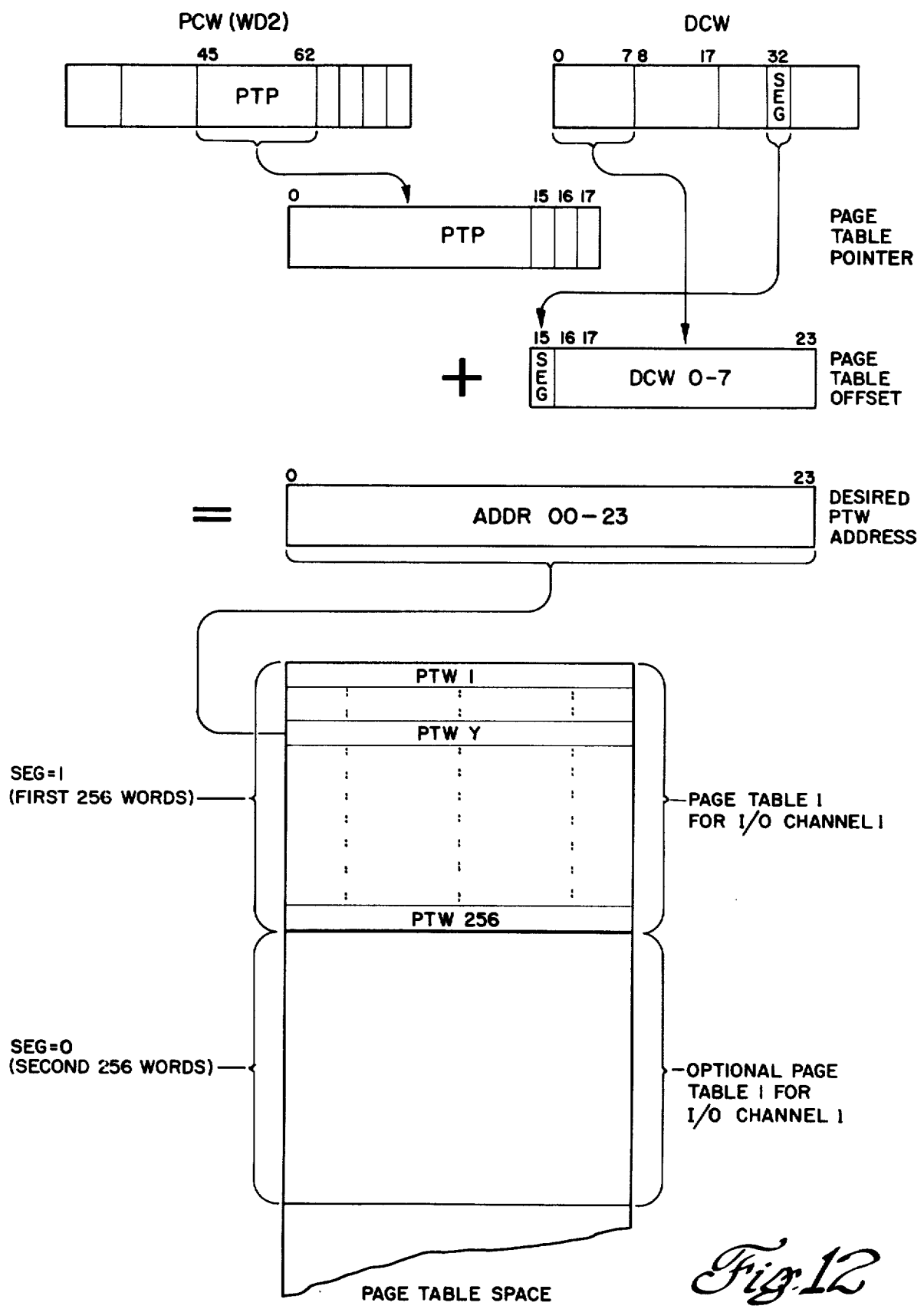
FIG. 12 is a representation of a first portion of an indirect data control word addressing service.

The DSEG, DCW0 and DCW1 bits are added to page table pointer bits 00-17 to generate ADDR 00-23 representing the desired page table word address. Refer to FIG. 12. The obtained page table word is subsequently combined with bits 8-17 of the DCW, representing the page offset, to provide the absolute memory address of the desired data location, as further described below in the detailed description of page table words.

For a direct data service, the data control word is provided to the I/O unit directly by the peripheral, and the channel page table is accessed by combining the page table pointer and the data control word.

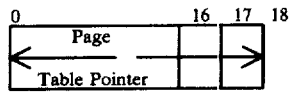

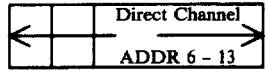

The direct channel address bits 06 and 07 are logically ORed with PTP bits 16 and 17 to generate ADDR 16, 17 of ADDR 00-23, representing the desired page table word address. The manner in which the direct channel address bits are logically combined with the PTP bits to generate ADDR 00-23 is substantially identical to the way in which ADDR 00-23 is generated for an indirect data service as described above with reference to FIG. 12, except that no SEG bit is involved and the overlapping bits are logically ORed instead of being added together. The obtained page table word is subsequently combined with bits 14-23 of the direct channel address, representing the page offset to provide the absolute memory address of the desired data location, as further described below.

For indirect data service up to 512 page table words may be accessed by reference to either of two page tables each having 256 PTW capacity. In the illustrative embodiment, an LPW or DCW seg-bit is provided in the LPW and DCW word formats to identify which of the two page table portions to use for memory addressing.

An address to an auxiliary page, i.e., a page not located in the page table, is obtained by combining an I/O unit base address located in a main memory mailbox with the I/O channel number.

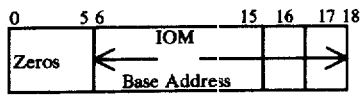

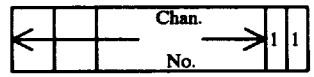

This auxiliary service is employed in the first list service to locate a DCW list for the channel. Thereafter, the DCWs are used as above described to access the memory unit until a transfer data control word (TDCW) is encountered in the list when LPW bit 23 = 1. A new DCW list is then obtained from the channel's page table.

In the illustrative embodiment a page table word (PTW) has the following format:

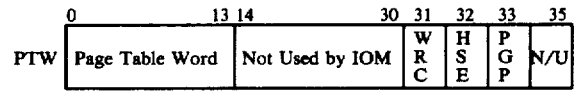

Bits 14-30 — Ignored by the IOM
34-35
Bit 31 — Write control bit
= 0, Page may not be written
= 1, Page may be written
The IOM is inhibited from writing only if LPW bit 23 is set (data is segmented) or a direct service is being requested.

Bit 32 — Housekeeping bit — identifies a page which contains processor information which may be accessed by the processor with privileged instructions only. The IOM is inhibited from writing in these pages only if it is a direct service or LPW bit 23 is set (data is segmented). It may read these pages at any time.
= 0, nonhousekeeping page
= 1, housekeeping page
Bit 33 — IOM page present/missing bit — provides an indication that the PTW contains a valid address.
= 0, page not in memory (missing)
= 1, page in memory (present)
Bits 0-13 — Page table word proper, representing the effective address of the beginning of a page in main memory.

The page table word is used to assist in determining the effective address of data or a DCW within a particular memory page as follows:

(Beginning of Page)

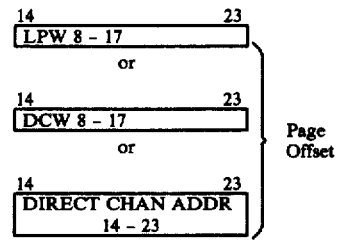

Figure 11:
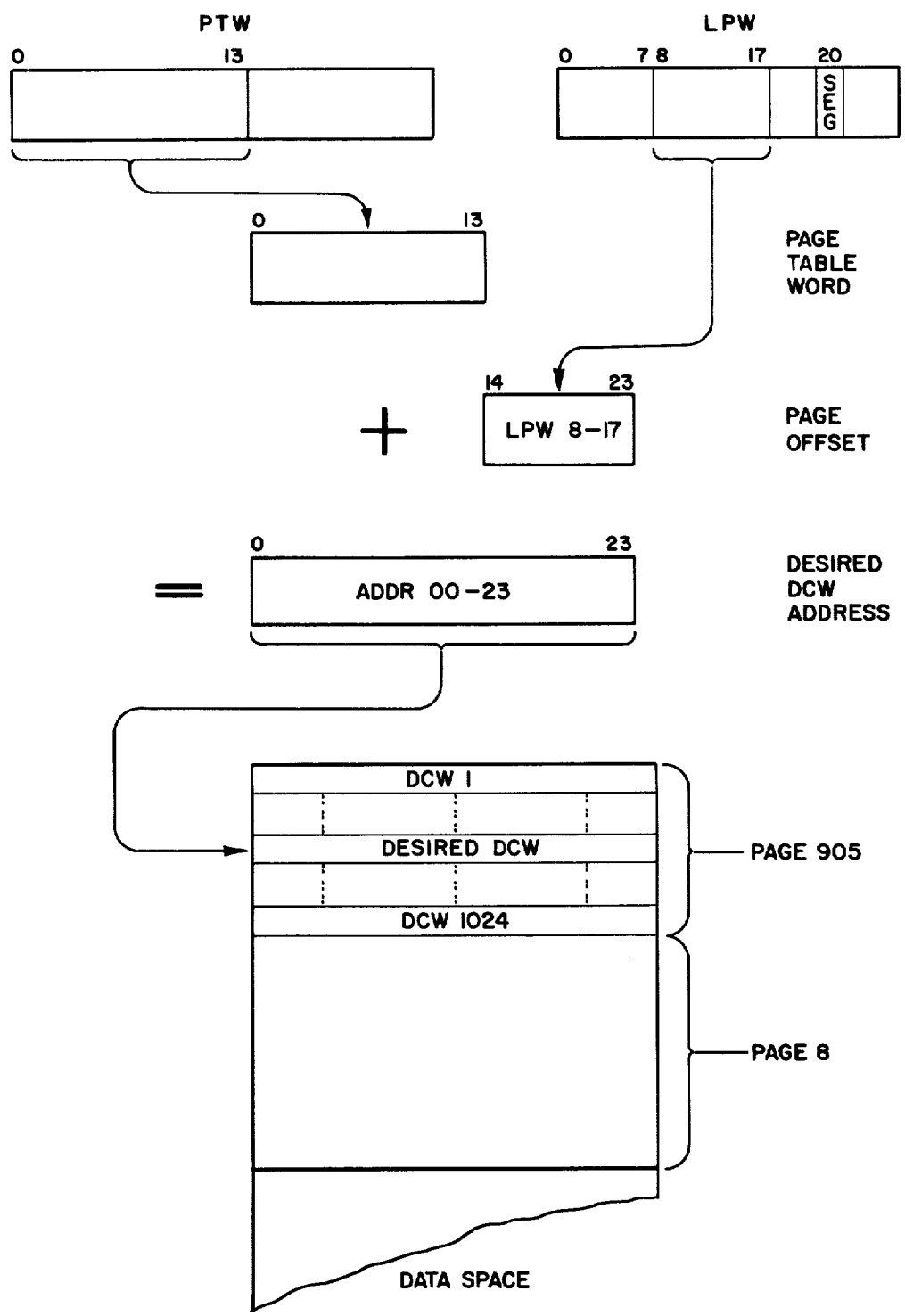
FIG. 11 is a representation of a second portion of a list pointer word addressing service.

Reference may be had to FIG. 11 which illustrates the manner in which bits 0-13 of the page table word (obtained through the manner illustrated in FIG. 10), representing the beginning of the desired page of DCWs, are concatenated with bits 8-17 of the list pointer word to form ADDR 00-23, representing the absolute address of the desired DCW.

Figure 13:
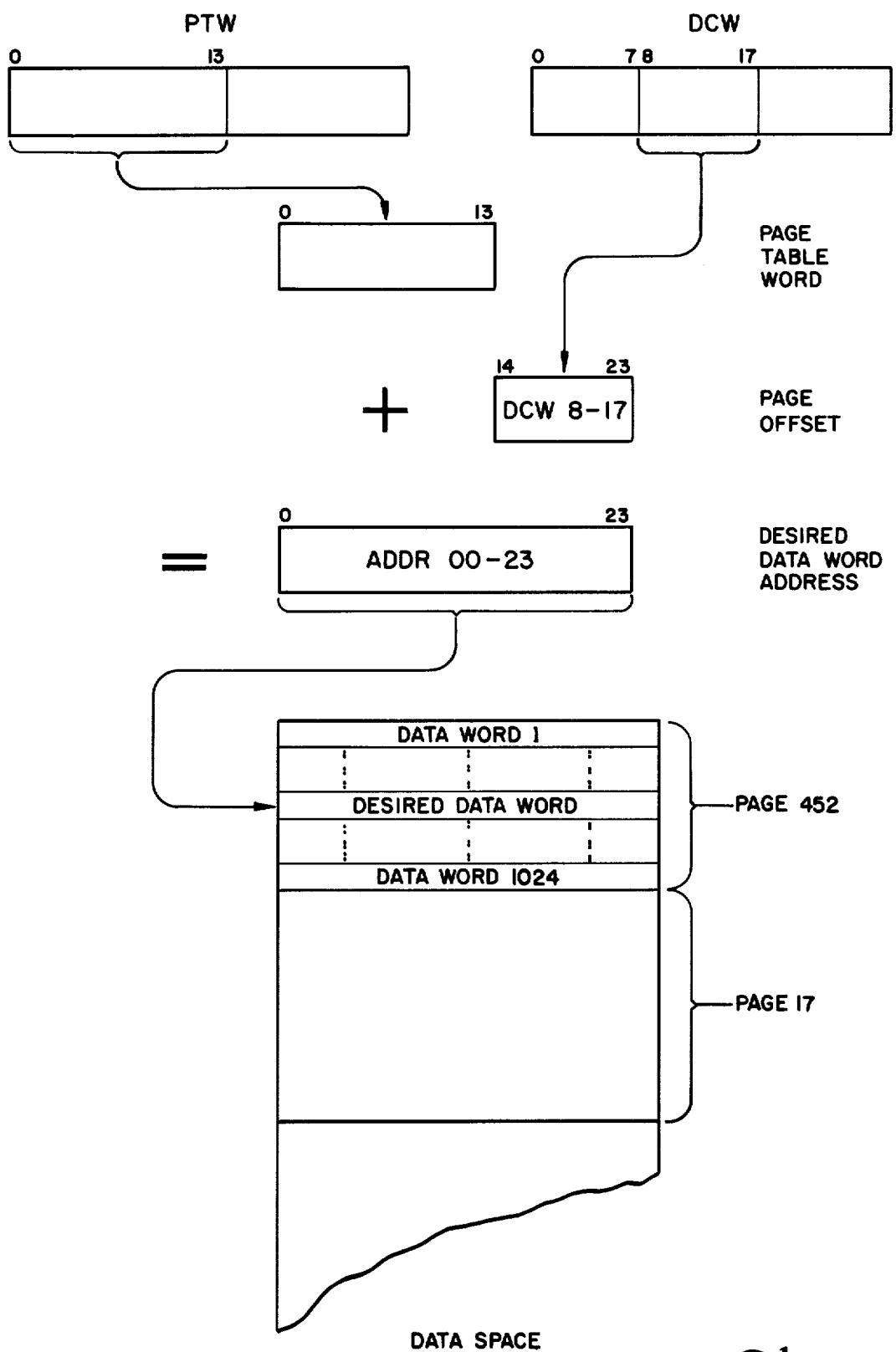
FIG. 13 is a representation of a second portion of an indirect data control word addressing service.

FIG. 13 illustrates, in similar fashion, how bits 0-13 of the page table word (obtained through the manner illustrated in FIG. 12), representing the beginning of the desired page of data, are concatenated with bits 8-17 of the data control word to produce ADDR 00-23, the absolute address of the desired data word. The manner in which bits 14-23, of the Direct Channel Address are concatenated with bits 0-13 of the page table word to give ADDR 00-23 is substantially identical to that shown in FIG. 13. The result of this operation is that LPW 8-17, DCW 8-17 or DIRECT CHAN ADDR 14-23 determine the offset within a 1024 word page selected by a page table word obtained from a page table, which page was located by combining LPW 0-7, DCW 0-7 or DIRECT CHAN ADDR 6-13 with the page table pointer and seg-bit.

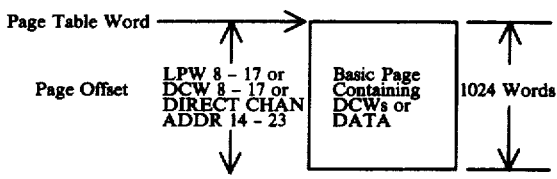

Extended Memory Accessing Operation

In this mode of operation an IOM channel can access a 512 word page table, representing 512K words of main memory, in one I/O operation. To accomplish this a mechanism is provided to increase the effective LPW and DCW address fields by one bit. This mechanism is implemented in four different ways as will be seen from the following description.

Figure 14:
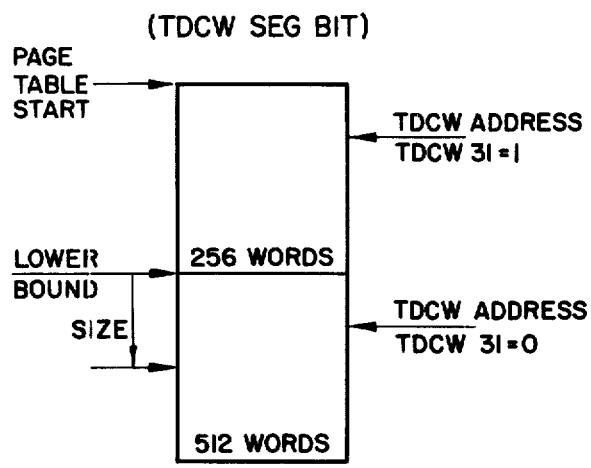
FIGS. 14-17 are representations of a page table being used in four different manners to access an extended main memory of 512K words.

The first way utilizes the TDCW bit 31 (SEG bit). Referring to FIG. 14 it will be seen that when TDCW 31=1 the list of DCW's is identified by a page table word resident in the first half of a 512 word page table. When TDCW 31=0 the page table word identifying the start of the DCW list is in the second half of the 512 word page table. The TDCW is generated by the operating system software only and is not under the control of the user. Once the start of the user's list of DCW's has been identified by the TDCW, then the user's program takes over with regard to subsequent memory accesses for that particular channel.

Figure 15:
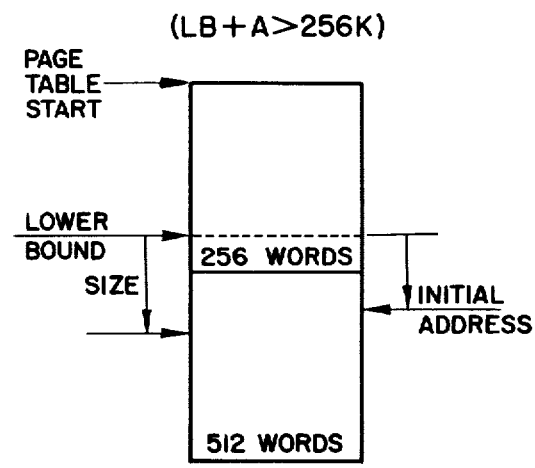
Figure 16:
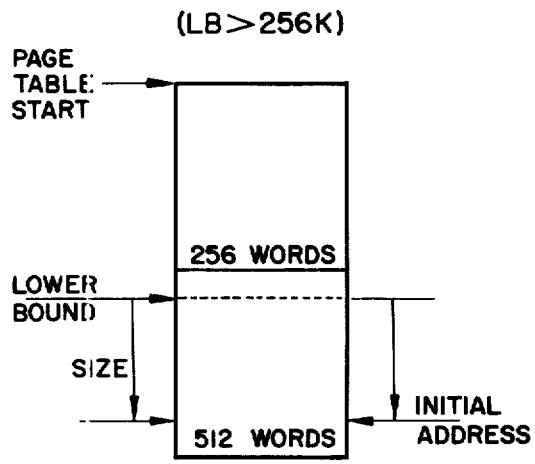

The second and third ways for accessing 512K words of main memory are related in that both involve setting the Lower Bound and Size such as to provide for the accessing of page table words in the second half of a 512 word page table. Referring to FIG. 15, it will be seen that one possibility is where the addition of a particular DCW address and the Lower Bound results in a 19-bit address field so that portions of the second 256K word block of main memory can be accessed. In this case the Lower Bound is less than 256K; however, the Size is such that the DCW address may be in the second 256K of memory. FIG. 16 shows the other possibility, where the Lower Bound exceeds 256K, thus permitting the DCW address to be in the second 256K regardless of the value of the Size.

Figure 17:
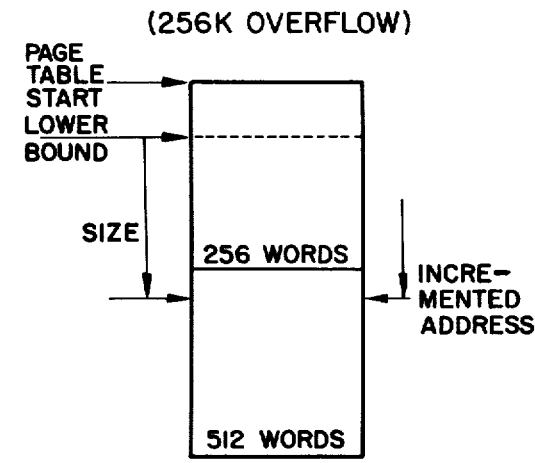

The fourth way which permits 512K words to be accessed is representationally shown in FIG. 17. In this case an overflow of an incremented LPW or DCW address through the 256K point is allowed, assuming of course that the Lower Bound and Size are properly set. This is permitted on other than a first list operation, as will be seen from the description below regarding the list service operation shown in FIG. 2.

FLOW DIAGRAMS

FIGS. 2-8 are flow diagrams illustrating the steps of a specific embodiment of the IOM addressing paged memory in accordance with the invention.

Figure 2:
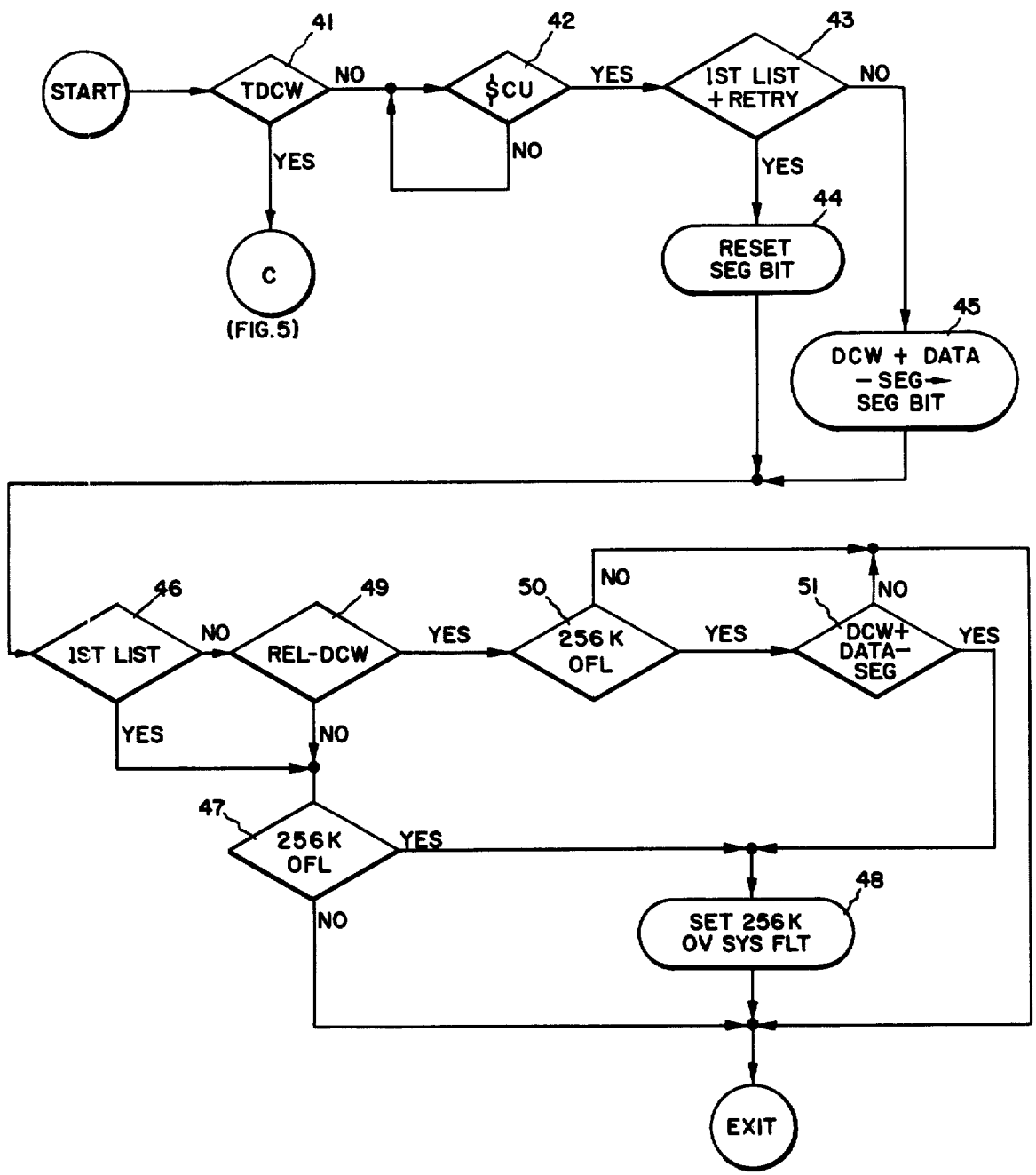
FIGS. 2-8 are flow diagrams illustrating the accessing of paged memory during an I/O operation in accordance with the preferred embodiment of the invention.

FIG. 2 is a portion of a list service for a data control word pull wherein the DCW is first checked for a transfer and, if not a TDCW, is checked for 256K overflow (one-half of page table reference capacity) and seg-bit flag. If the seg-bit is set then the data addressed from the page table is limited to 256K; if not set then 512K of data may be addressed. Absolute addressed data is limited to 256K; relative (paged) addressed data may be 512K words.

Figure 3:
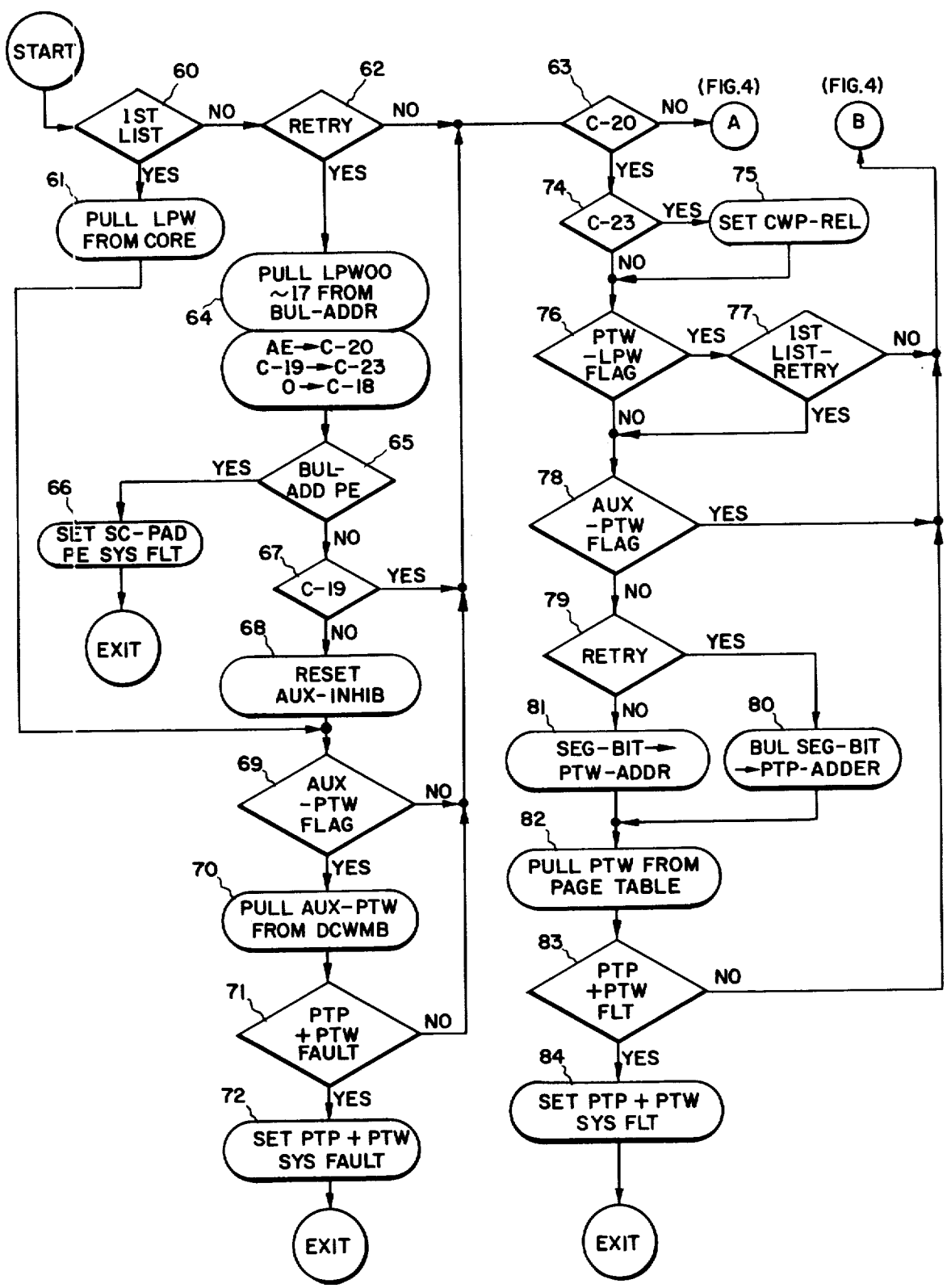

FIG. 3 is an LPW pull and a PTW pull, including checks for an auxiliary service, a retry (requiring reference to a back-up list), and whether the list is paged or not.

Figure 4:
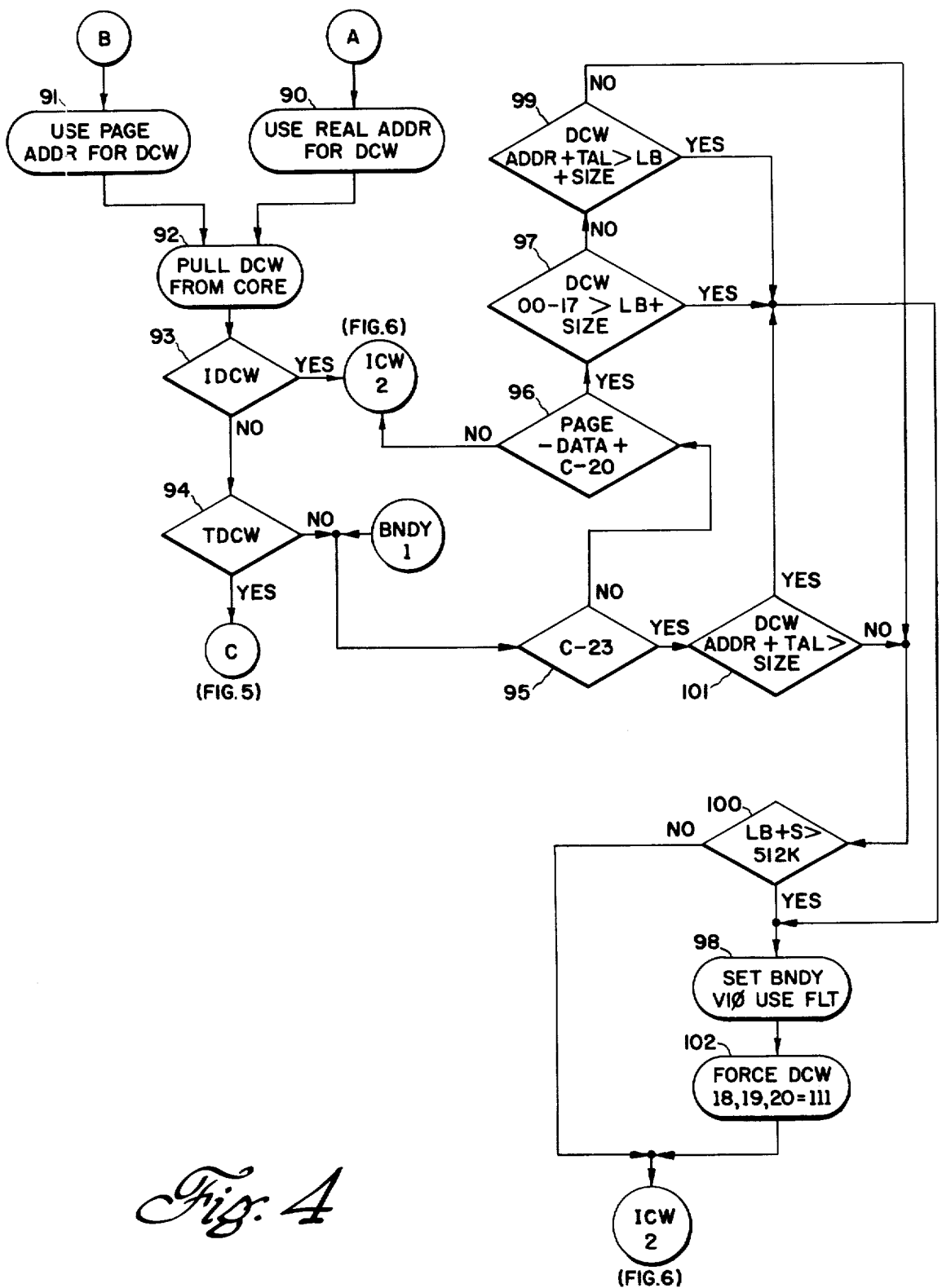

FIG. 4 is a portion of a list service for a DCW pull, using either a paged or real address, and check for a transfer. The DCW is checked for a boundary fault, and if no fault exists the DCW is stored.

Figure 5:
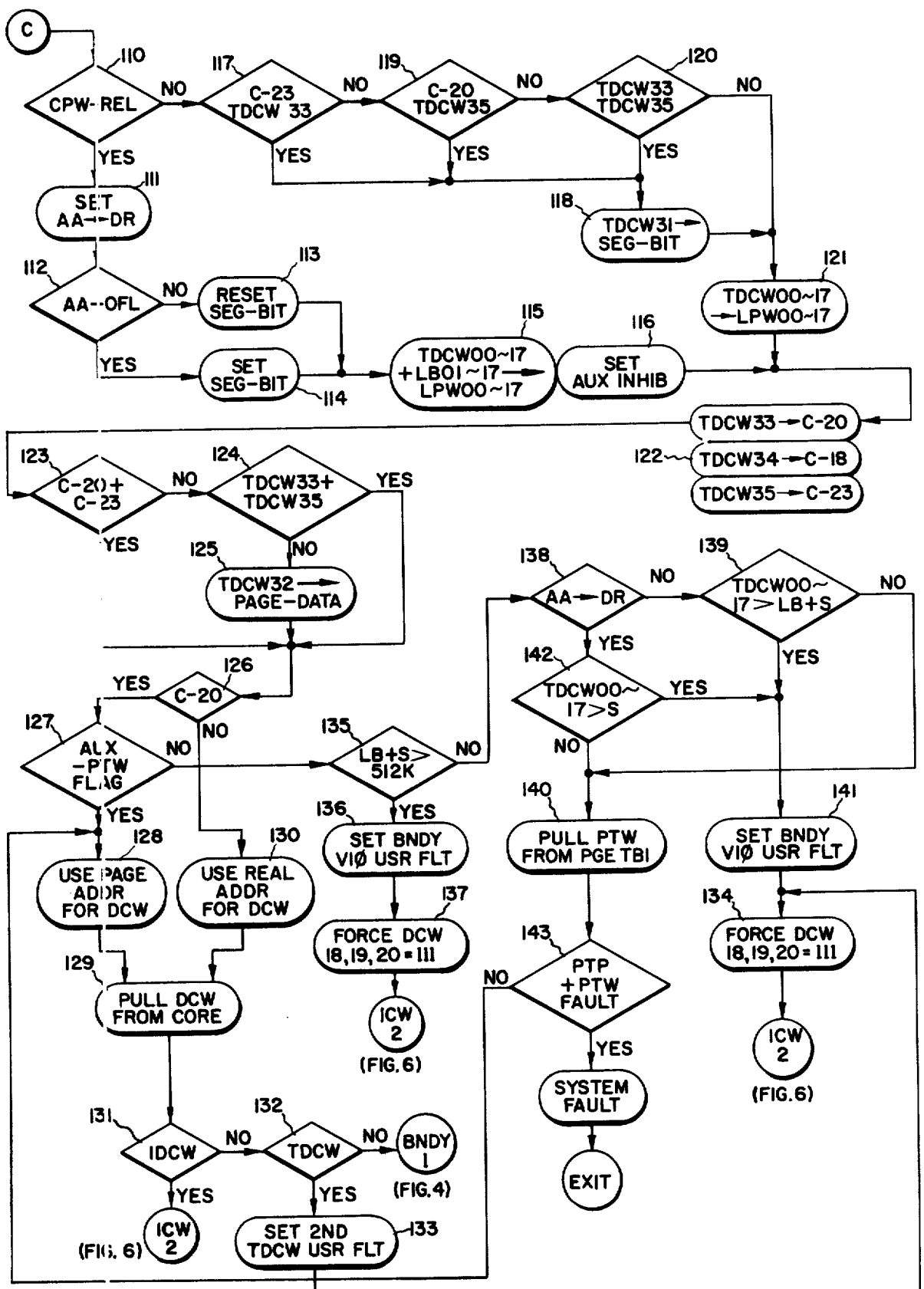

FIG. 5 is a portion of a list service cycle for a transfer data control word (TDCW) whereby a transfer from one list to another list is effected.

Figure 6:
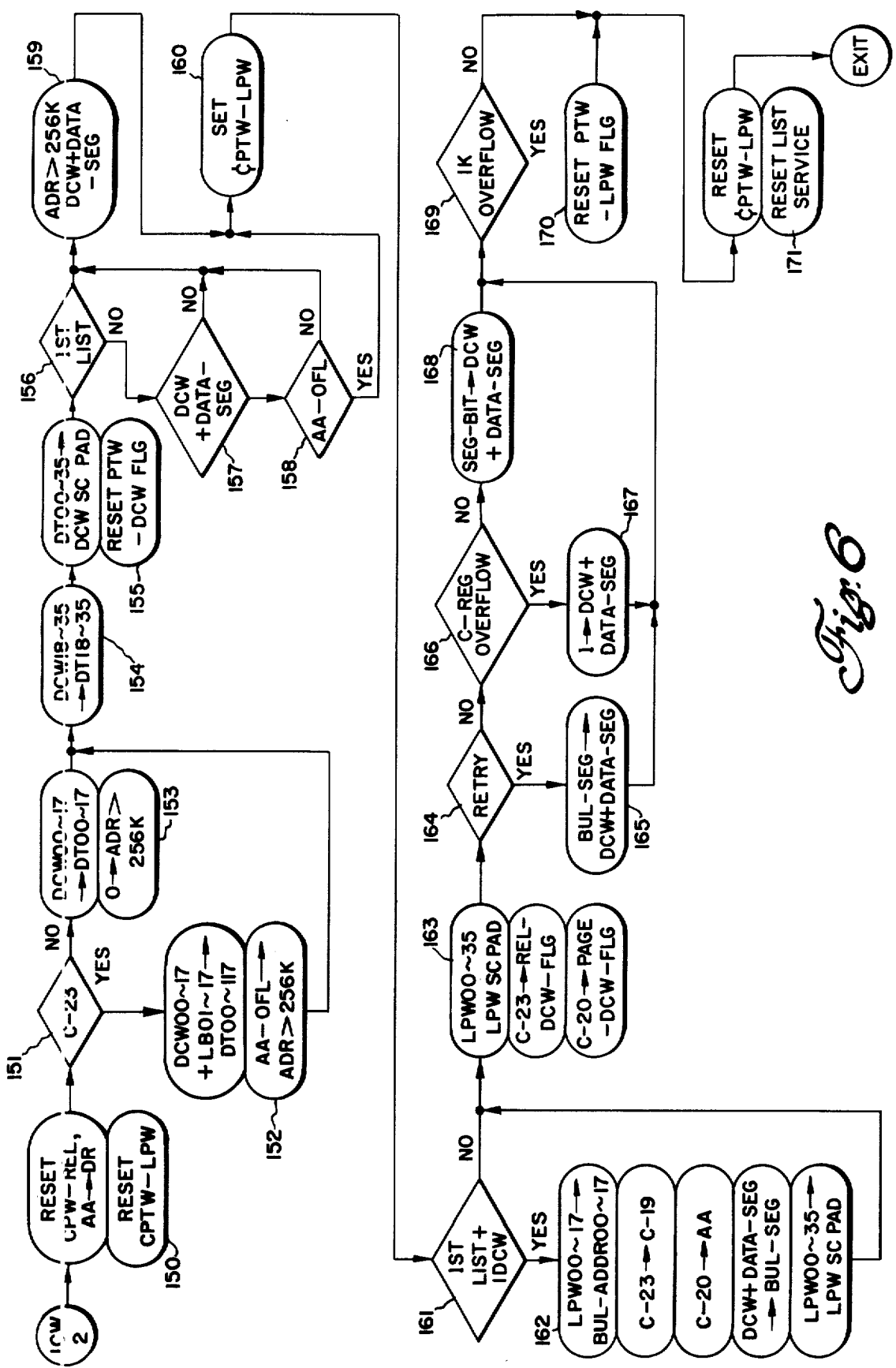

FIG. 6 is a portion of a list service for the storing of the new DCW and restoring of the LPW.

Figure 7:
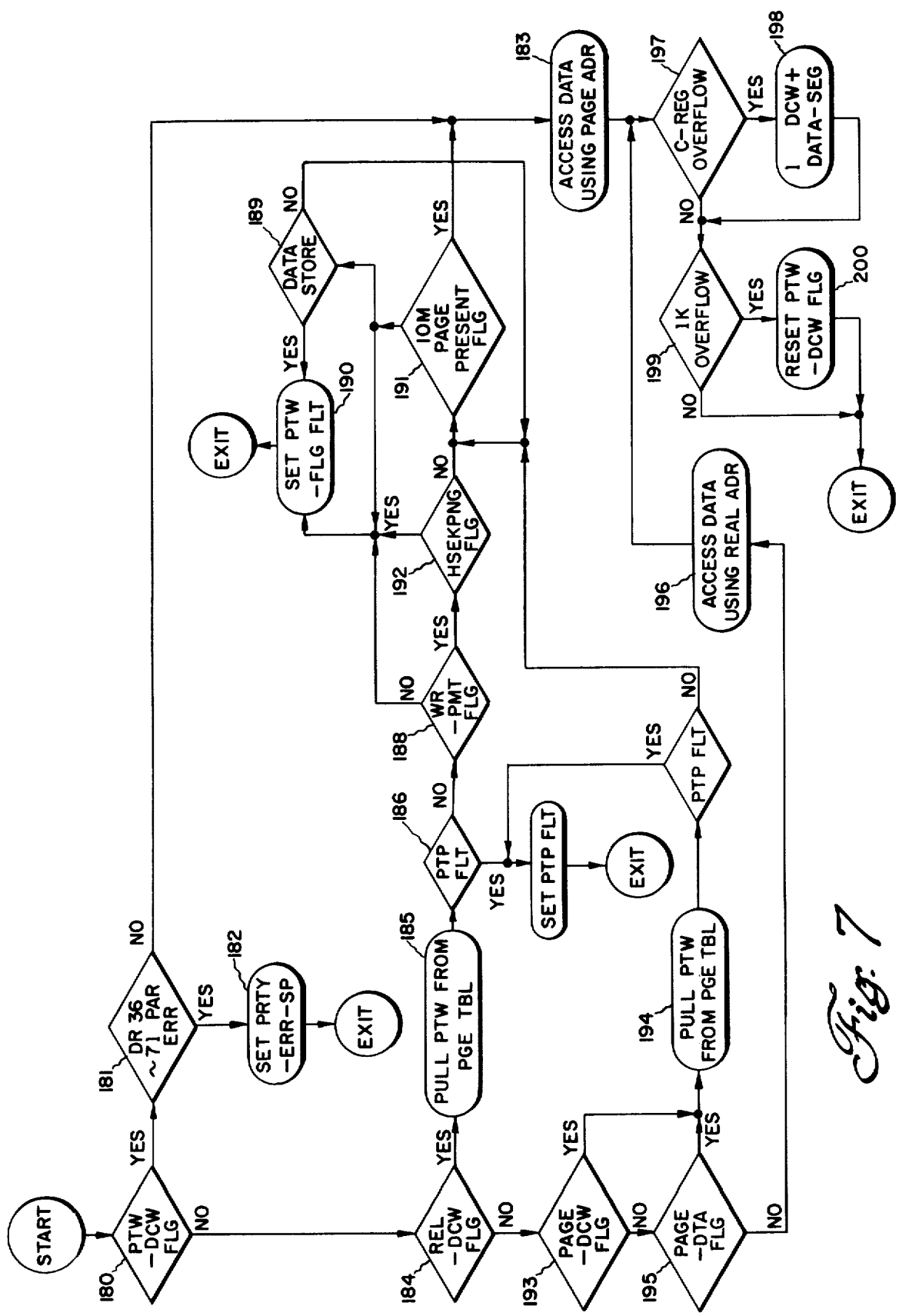

FIG. 7 is an indirect data service including a DCW pull, PTW pull and checks, data access, and restoring of the DCW.

Figure 8:
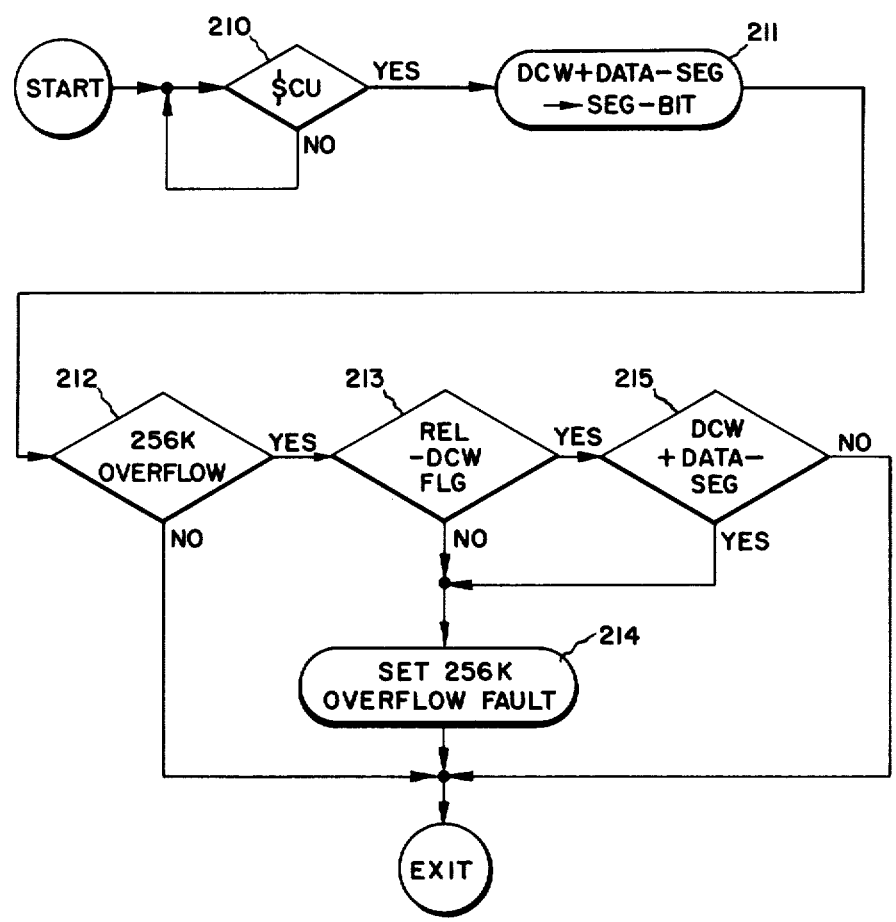

FIG. 8 is a portion of a data service, including a check for overflow faults.

FIG. 2 — LIST SERVICE FOR DCW PULL, SEG AND 256K OVERFLOW

FIG. 2 is a flow diagram of a portion of a data control word pull procedure and the checking of seg (page table) or 256K (memory) overflow faults.

41 — Is the pulled word from the mailbox a TDCW? If yes, exit to point C in FIG. 5.

42 — If not a TDCW, then await the signal to store the LPW in the C-Reg.

43 — Is the request a first list or a retry?

44 — If yes, then reset the seg-bit.

45 — If no, then set the seg-bit if a DCW or data seg-bit is set (hardware scratchpad read out to latch).

46 — Is this a first list?

47 — If yes, then check for 256K overflow. If no overflow then exit this procedure.

48 — If a 256K overflow then set the 256K overflow system fault and exit.

49 — If this is not a first list then check for a relative (paged) or absolute DCW. If absolute, then proceed to 47 for 256K overflow check.

50 — If a paged DCW then check for 256K overflow. If no overflow then exit.

51 — If a 256K overflow then check the seg-bit, if not set then the 256K overflow can be accommodated by use of two page tables, if set then the second page table cannot accommodate the overflow and a system fault is set at 48.

FIG. 3 — LIST POINTER WORD PULL AND PAGE TABLE WORD PULL

60 — Is this the first list?

61 — If yes, then pull the LPW from core and proceed to 69.

62 — If no, is this a retry?

63 — If no, check bit C-20 to determine if the DCW list is addressed real or paged.

64 — If a retry, then the LPW is pulled from the back-up list address.

65 — Check the back-up list address for parity error.

66 — If a parity error, set the scratchpad parity error system fault and exit.

67 — If no parity error, check bit C-19 for requirement for reaccess of the auxiliary PTW (reset means reaccess required). If set, then proceed to point 63.

68 — If reaccess required, then reset the auxiliary PTW inhibit.

69 — Is the auxiliary PTW flag set? If no, then proceed to point 63.

70 — If yes, then pull the auxiliary PTW from the DCW mailbox in core.

71 — Is there a PTP or PTW fault? If no, then proceed to point 63.

72 — If a PTP or PTW fault, then set a system fault and exit.

63 — If bit C-20 indicates the DCW list is not paged, then proceed to point A in FIG. 4.

74 — If the DCW list is paged then check bit C-23 for segmented data.

75 — If the data is segmented then set the control word pull-relative flag and proceed to 76.

76 — Check the PTW-LPW flag for validity of the word.

77 — If the PTW-LPW is valid then check for a first list or retry. If no, then go to point B of FIG. 4.

78 — If the PTW-LPW flag indicates an invalid PTW-LPW, or if a first list or retry, check for an auxiliary PTW. If an auxiliary PTW then proceed to point B of FIG. 4.

79 — If not an auxiliary PTW check for a retry.

80 — If a retry, load the PTP address with the back-up list seg-bit.

81 — If not a retry, load the PTP address with the pulled word seg-bit.

82 — Pull the PTW from the page table using the resultant address.

83 — Check the PTP and PTW fault bit, if no fault then proceed to point B of FIG. 4.

84 — If a PTP or PTW fault then set the system fault and exit.

FIG. 4 — LIST SERVICE FOR NEW DCW PULL

90 — Use the real address for the DCW.

91 — Use the page address for the DCW.

92 — Pull the DCW from core.

93 — Check for an IDCW; if yes, then proceed to point ICW2 in FIG. 6.

94 — If not an IDCW, check for a TDCW; if yes, then proceed to point C of FIG. 5.

95 — If not a TDCW, then check bit C-23 for segmented data.

96 — If not segmented then check for paged data. If not paged then proceed to point ICW2 in FIG. 6.

97 — If data is paged, check the address for being within the lower bound plus size for the data.

98 — If the address exceeds the lower bound plus size, then set the boundary fault.

99 — If the address is within the lower bound size, check the DCW address plus tally being greater than the lower bound plus size. If yes, go to point 98 and set the boundary fault.

100 — If no, then check the lower bound plus size being greater than 512K words (outside of a page table reference capacity); if yes, set the boundary fault at 98; if no, then proceed to point ICW2 of FIG. 6.

101 — If bit C-23 indicates a segmented mode (point 95), check the DCW address plus tally being greater than the segment size; if yes proceed to point 98; if no proceed to point 100.

102 — If a boundary fault is detected, set DCW 18, 19, 20 to 111 so that if the channel attempts to use this DCW system fault "Illegal Character Position" will occur.

FIG. 5 — TDCW LIST SERVICE

110 — Was the control word pulled absolute or relative?

111 — If relative, then DCWs are in the user's list.

112 — Does the absolute address overflow?

113 — If no, then the DCWs are in the first 256 page table, and the seg-bit is reset.

114 — If yes, then DCWs are in the second 256 page table, and the seg-bit must be set.

115 — The TDCW address and lower bounds give the list pointer word address.

116 — Set the auxiliary PTW inhibit as the PTW will be obtained from the page table.

117 — If the pulled control word is not in the user's list, are C-23 and TDCW -33 set?

118 — If yes, load TCDW bit 31 into the seg-bit, and go to 121.

119 — If no, are C-20 and TDCW35 set? If yes, go to 118.

120 — If no, are TDCW33 and TDCW35 set? If yes, go to 118.

121 — If no, load TDCW address into the LPW address.

122 — Submode of the IOM is established by loading TDCW bits 33, 34, 35 into C-20, C-18, C-23, respectively.

123 — Check C-20 or C-23 for data absolute. If yes, proceed to 126.

124 — If no, check TDCW33, 35 for DCW paged or data segmented.

125 — If no, load TDCW32 into the page data flag, and proceed to 126. If yes, proceed to 126.

126 — Check C-20 for DCW list paged.

127 — If yes, check the auxiliary PTW flag.

128 — If yes, use the page address for the DCW.

129 — Pull the DCW from core.

130 — If the DCW list is not paged, then use the real address for the DCW, and pull from core at 129.

131 — If the pulled DCW is an IDCW, then go to ICW2 in FIG. 6.

132 — If not an IDCW, check for a TDCW; if no go to BNDY1 in FIG. 4 for boundary fault check.

133 — If a TDCW, then set a user fault for two TDCWs, and proceed to 134.

134 — Force the DCW bits 18, 19, 20 to 111 and proceed to ICW2 in FIG. 6.

135 — If the auxiliary PTW flag is not set, then check for lower bound plus size exceeding 512K words.

136 — If yes, set boundary fault.
137 — Set DCW 18, 19, 20 to 111 and go to ICW2 of FIG. 6.
138 — Check whether data is segmented.
139 — If no, then check the TDCW address being outside the lower bound plus size.
140 — If no, pull the PTW from the page table using the new LPW address obtained from 118 and 121.
141 — If yes, set a boundary fault and proceed to 134.
142 — If data is segmented, is the TDCW address greater than a segment size. If yes proceed to a boundary fault at 141.
140 — If no, then pull the PTW from the page table using the new LPW address obtained from 115.
143 — Check the PTP or PTW fault flag. If a PTP or PTW fault, then exit. If no fault, then proceed to 128 and use the page address for the DCW.

FIG. 6 — LIST SERVICE FOR STORING NEW DCW AND RESTORING LPW

150 — Beginning at the ICW2 entry point, reset control lines for CWP-relative and the PTW-LPW enable.
151 — Check bit C-23 for segmented data.
152 — If yes, then DT 00-17 is loaded with the result of the DCW plus lower bound addition. The state of the overflow of this addition is stored in a latch, ADR >256K, in order to indicate first 256 or second 256 word half of page table.
153 — If data is not segmented then the DCW address is placed into DT 00-17.
154 — DCW 18-35 is loaded into DT 18-35.
155 — DT 00-35 is stored in DCW scratchpad and the PTW-DCW flag is reset.
156 — Is this a first list?
157 — If no, is the DCW or data seg-bit true? If no go to 159.
158 — If yes, check the absolute address overflow. If yes, go to 160; if no go to 159.
159 — Set the DCW or data seg-bit to the same logical state as the ADR>256K latch.
160 — Set the PTW-LPW enable.
161 — Is this a first list or IDCW? If no go to 163.
162 — If yes, the back-up list address is loaded from the LPW.
163 — The LPW scratchpad is loaded, the REL DCW and PAGE DCW flags are loaded.
164 ' Is this a retry?
165 ' If yes, then DCW or data seg must be set to the same logical state as the back-up list seg, proceed to 169.
166 — If not a retry, check for a control register overflow.
167 — If an overflow, then a 1 is placed into the DCW or data seg-bit to indicate that the DCW list has flowed through the 256K boundary.
168 — If no overflow, the old seg-bit is transferred to the DCW or data seg-bit.
169 — Is there a 1K overflow of the page?
170 — If yes, the PTW-LPW flag is reset and proceed to 171.
171 — The list service is reset and exit.

FIG. 7 — INDIRECT DATA SERVICE

180 — Is the PTW-DCW flag set indicating a valid page?
181 — If yes, is there a parity error?
182 — If yes, set the parity error in scratchpad and exit.
183 — If no, access data using page address.
184 — If an invalid PTW at 180 is the DCW segmented?
185 — If yes, pull the PTW from the page table.
186 — Is there a PTP fault?
187 — If yes, set the fault flag and exit.
188 — If no, then check the write permit flag.
189 — If no write permit, check if this is a data store.
190 — If yes, then set a PTW-flag fault and exit.
191 — If not a data store then check the IOM page present flag. If not present, then proceed to 190 and set the PTW fault flag. If present, access data at 183.
192 — If write permit flag is present, check the housekeeping flag for a housekeeping page. If so go to 189. If not go to 191.
193 — If no REL-DCW flag and data is not segmented, is then a page-DCW flag?
194 — If yes, then pull the PTW from the page table.
195 — If no, check for a page-data flag; if yes, then pull the PTW from the page table at 194.
196 — If no, data is accessed using real address.
197 — Data is accessed and the control register is checked for overflow.
198 — If yes, a 1 is loaded in the DCW or data seg-bit.
199 — If no, the 1K overflow is checked, if no then exit.
200 — If yes, reset the PTW-DCW flag and exit.

FIG. 8 — DATA SERVICE CHECK FOR OVERFLOW FAULTS, INCLUDING SEG AND 256K OVERFLOW

210 — Await the C-register strobe.
211 — Scratchpad DCW or data seg is read into seg-bit flag.
212 — Is there a 256K memory overflow? If no then exit.
213 — If yes, is the data segmented?
214 — If no, set the 256K overflow fault.
215 — If yes is the seg-bit set? If yes then data is in the second half of the page table and thus a data overflow; set fault and exit. If no, then no overflow fault, exit.

It will be apparent to those skilled in the art that the disclosed Method of Accessing Paged Memory By An Input-Output Unit may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. In an electronic data processing system including a memory, a central processing unit, an input-output unit having a plurality of peripheral channels, a plurality of peripheral devices each communicating with said central processing unit and said memory through one of said peripheral channels of said input-output unit, and a system controller for coordinating the operation of said memory, said central processing unit, and said input-output unit, the method of addressing paged data in said memory by said input-output unit wherein such paged data may have absolute addresses greater than the address field of the control words used to access such paged data, said method comprising the steps of:

a. storing data in said memory in pages, each page comprising a plurality of contiguous, finite memory locations and each page being identified by a page table word,
b. establishing in said memory a page table for each of said peripheral channels, each page table including a plurality of page table words, each page table further including first and second portions, said first portion containing page table words identifying pages in a first address space of said memory, said second portion containing page table words identifying pages in a second address space of said memory, said first and second address spaces being non-overlapping,
c. assigning a peripheral control word to one of said peripheral channels, said peripheral control word including as a portion thereof a page table pointer for identifying the location in said memory of the beginning of the page table established for said one peripheral channel,
d. storing the page table word which identifies the memory page containing the data to be accessed in the page table established for said one peripheral channel,
e. assigning a data control word to said one peripheral channel, said data control word including a first field indicating which portion of the page table established for said one peripheral channel contains said page table word, and a second field indicating the location of said page table word within said portion,
f. utilizing said first and second fields of said data control word and said page table pointer to locate in said memory said page table word,
g. utilizing said page table word to access data in the page corresponding to said page table word, and
h. transferring said data between said page and the peripheral device connected to said one peripheral channel.

* * * * *